US011386486B1

(12) United States Patent
Rogerson et al.

(10) Patent No.: US 11,386,486 B1
(45) Date of Patent: Jul. 12, 2022

(54) AUTOMATED AND RELIABLE DETERMINATION OF A FORWARD VALUE ASSOCIATED WITH A FUTURE TIME PERIOD BASED ON OBJECTIVELY DETERMINED EXPECTATIONS RELATED THERETO

(71) Applicant: Chicago Mercantile Exchange Inc., Chicago, IL (US)

(72) Inventors: Mark Andrew Rogerson, London (GB); Kimberly Joy Eyers, Chicago, IL (US); David Edward Bixby, Jr., Arlington Heights, IL (US); Agha Irtaza Mirza, New York, NY (US)

(73) Assignee: Chicago Mercantile Exchange Inc., Chicago, IL (US)

( * ) Notice: Subject to any disclaimer, the term of this patent is extended or adjusted under 35 U.S.C. 154(b) by 822 days.

(21) Appl. No.: 15/954,175

(22) Filed: Apr. 16, 2018

(51) Int. Cl.
*G06Q 40/02* (2012.01)
(52) U.S. Cl.
CPC .................... *G06Q 40/02* (2013.01)
(58) Field of Classification Search
USPC .......................................................... 705/35
See application file for complete search history.

(56) References Cited

U.S. PATENT DOCUMENTS

| | | | |
|---|---|---|---|
| 7,831,491 B2 | 11/2010 | Newell et al. | |
| 7,853,499 B2 | 12/2010 | Czupek et al. | |
| 2005/0096999 A1 | 5/2005 | Newell et al. | |
| 2006/0080203 A1* | 4/2006 | Tuckman | G06Q 40/00 705/35 |
| 2008/0281762 A1* | 11/2008 | Tuckman | G06Q 40/04 705/36 R |
| 2014/0006243 A1 | 1/2014 | Boudreault et al. | |
| 2017/0331774 A1 | 11/2017 | Peck-Walden et al. | |
| 2018/0108087 A1* | 4/2018 | Sandor | G06Q 40/025 |

(Continued)

OTHER PUBLICATIONS

"30-Day Federal Funds Futures and Options", Interest Rates, CME Group, 2011, 4 pages.

(Continued)

*Primary Examiner* — Ambreen A. Alladin
(74) *Attorney, Agent, or Firm* — Lempia Summerfield Katz LLC

(57) ABSTRACT

The disclosed embodiments relate to computing a forward interest rate for a select future time period subsequent to a current date, such as 1 month, 3 month, 6 month or 12 month term, utilizing data observed or otherwise derived from the trading of futures contracts having short term interest rate based underliers, e.g. based on overnight interest rates, and, in one embodiment, are integrated with an electronic transaction processing system, e.g. an electronic trading system, to access data indicative of the trading thereof, and therefore avoid reliance upon subjective/opinion inputs. Generally, the disclosed embodiments generate a model of expected interest rates for every day of the time period for which a forward interest rate is desired based on a set of interest rate futures contract whose expiration periods cover the period. The disclosed embodiments enable automated determination of a stable, replicatable and risk-free short term forward reference rate which further eliminates the inherent issues with LIBOR discussed above.

26 Claims, 10 Drawing Sheets

(56) References Cited

U.S. PATENT DOCUMENTS

2019/0172131 A1* 6/2019 Mirza .................... G06Q 40/04
2020/0372522 A1* 11/2020 Sandor ............... G06Q 30/0201

OTHER PUBLICATIONS

"Closed-Form Solution", Wolfram MathWorld, Jan. 10, 2018, 1 page, http://mathworld.wolfram.com/Closed-FormSolution.html.
"CME Three-Month SOFR Futures and One-Month SOFR Futures", CME Group, 2018, 4 pages.
"LIBOR Alternatives Under Development", Office of Financial Research, retrieved Nov. 30, 2017, 3 pages, https://www.financialresearch.gov/data/libor-alternatives/.
"Quadratic Programming", Wikipedia, Nov. 27, 2017, 7 pages, https://en.wikipedia.org/wiki/Quadratic_programming.
"Replacing LIBOR: The Countdown Begins", Forbes, Tortoise Investments, Aug. 16, 2017, 3 pages, https://www.forbes.com/sites/tortoiseinvest/2017/08/16/replacing-libor-the-countdown-begins/#111fe64e4e2b.
"Time-weighted average price", Wikipedia, Nov. 16, 2016, 1 page, https://en.wikipedia.org/wiki/Time-weighted_average_price.
"Volume-weighted average price", Wikipedia, May 30, 2017, 2 pages, https://en.wikipedia.org/wiki/Volume-weighted_average_price.
Ben Moshinsky, "The Bank of England is Taking Over the Replacement for Libor", Business Insider, Oct. 16, 2017, 2 pages, http://www.businessinsider.com/sonia-timeline-alternative-to-libor-2017-10.
Burghardt et al., "The Convexity Bias in Eurodollar Futures", Carr Futures, Sep. 16, 1994, 16 pages.
Closed-form expression, Wikipedia, Oct. 22, 2017, 5 pages, https://en.wikipedia.org/wiki/Closed-form_expression.
ICE Swap Rate, Intercontinental Exchange, Feb. 20, 2017, 8 pages, https://www.theice.com/iba/ice-swap-rate.
Interim Report and Consultation of the Alternative Reference Rates Committee, May 2016, 35 pages.
James J. Boudreault, "Hedging Borrowing Costs with Eurodollar Futures and Options", Interest Rate Products, CME Group, 2010, 4 pages.
John Labuszewski, "Understanding Eurodollar Futures", Interest Rates, CME Group, 2013, 24 pages.
Keasler et al., "Using Fed Funds Futures to Predict a Federal Reserve Rate Hike", Journal of Economics and Finance Education, 2007, 6 pages, vol. 6, No. 2.

* cited by examiner

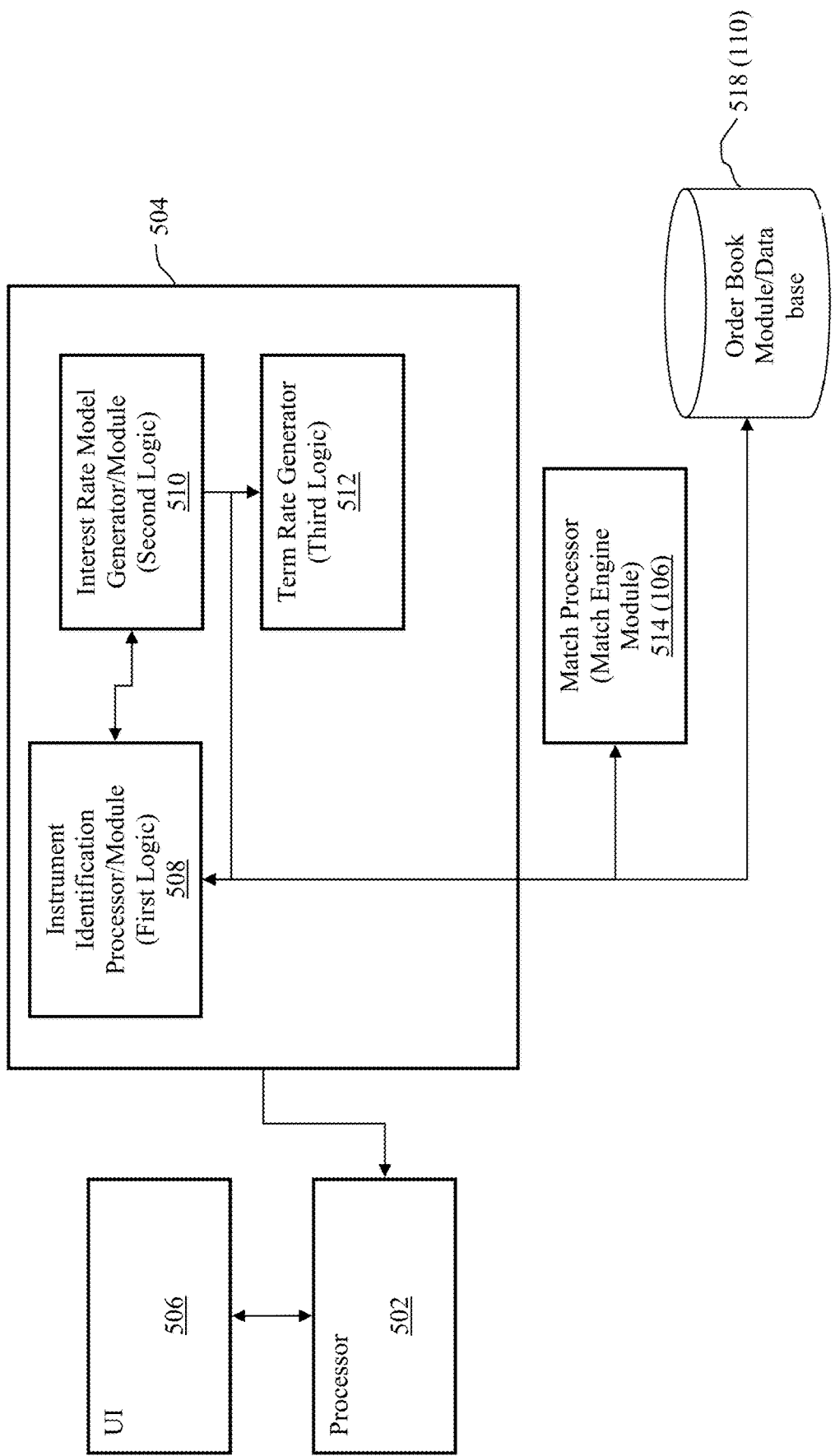

Fig. 8

| | CME Three-Month SOFR Futures | CME One-Month SOFR Futures |
|---|---|---|
| Trading Unit | Compounded daily Secured Overnight Financing Rate ("SOFR") interest during contract Reference Quarter, such that each basis point per annum of interest = $25 per contract.<br><br>Reference Quarter: For a given contract, interval from (and including) 3rd Wed of 3rd month preceding Delivery Month, to (and not including) 3rd Wed of Delivery Month. | Average daily Secured Overnight Financing Rate ("SOFR") interest during futures contract Delivery Month, such that each basis point per annum of interest is worth $41.67 per futures contract. |
| Price Basis | Contract-grade IMM Index: 100 minus R.<br>R = compounded daily SOFR interest during contract Reference Quarter.<br>Example: Contract price of 97.2950 IMM index points signifies R = 2.705 percent per annum. | Contract-grade IMM Index: 100 minus R.<br>R = average daily SOFR interest during contract Delivery Month. |
| Contract Size | $2,500 x contract-grade IMM Index | $4,167 x contract-grade IMM Index |
| Minimum Price Increment (MPI) | Contracts with Four Months or Less Until Termination of Trading: 0.0025 IMM Index points (¼ basis point per annum) equal to $6.25 per contract.<br>All Other Contracts: 0.005 IMM Index points (½ basis point per annum) equal to $12.50 per contract. | 0.005 IMM Index points (½ basis point per annum) equal to $20.835 per contract, provided that:<br>• If first day of contract Delivery Month is Sat, Sun, or Mon, then MPI is 0.0025 index points, equal to $10.4175 per contract, as of first trading day of contract Delivery Month.<br>• If first day of contract Delivery Month is Tue, Wed, Thurs, or Fri, then MPI is 0.0025 index points, equal to $10.4175 per contract, as of last Sunday of month preceding contract Delivery Month. |
| Termination of Trading | Last Day of Trading: Exchange Business Day first preceding 3rd Wed of Delivery Month.<br>Termination of Trading: Close of CME Globex trading on Last Day of Trading. | Last Day of Trading: Last Exchange Business Day of contract Delivery Month. |
| Delivery | Cash settlement, by reference to Final Settlement Price, on first US government securities market business day following Last Day of Trading.<br><br>Final Settlement Price: Contract-grade IMM index evaluated on the basis of realized SOFR values during contract Reference Quarter:<br>$R = \{ \prod_{i=1}^{n} (1 + (d_i/360) \cdot (r_i/100)) - 1 \} \times (360/D) \times 100$<br>n = Number of US government securities market business days in the Reference Quarter<br>i = Running variable indexing US government securities market business days during Reference Quarter<br>$\prod_i$ denotes the product of values indexed by the running variable, i = 1, 2, ..., n.<br>$r_i$ = SOFR value for $i^{th}$ US government securities market business day<br>$d_i$ = Number of calendar days to which $r_i$ applies<br>D = $\sum_i d_i$ (ie, number of calendar days in Reference Quarter) | Final Settlement Price: Contract-grade IMM Index evaluated at R = arithmetic average of daily SOFR during Delivery Month. |
| Delivery Months | Nearest 20 March Quarterly months (Mar, Jun, Sep, Dec).<br>For each contract, Contract Month is the month in which Reference Quarter begins. Example: For a "Sep" contract, Reference Quarter starts on IMM Wed of Sep and ends with Termination of Trading on the first US government securities market business day before IMM Wed of Dec, the contract Delivery Month. | Nearest 7 calendar months |
| Trading Venues and Hours | CME Globex and CME ClearPort: 5 p.m. to 4 p.m. Sun-Fri. | |
| CME Globex Algorithm | Allocation (A Algorithm, with Top Order Allocation = 100% and Pro Rata Allocation = 100%) | Split FIFO and Pro-Rata (K Algorithm, with Top Order Allocation = 100% and Pro Rata Allocation = 100%) |
| Block Trade Minimum Size | ATH 1,000 contracts<br>ETH 2,000<br>RTH 4,000<br>ATH – Asian Trading Hours (9pm–12am, Mon-Fri on regular business days and at all weekend times)<br>ETH – European Trading Hours (12am – 7am, Mon-Fri on regular business days)<br>RTH – Regular Trading Hours (7am–4pm, Mon-Fri on regular business days) | ATH 500 contracts<br>ETH 1,000<br>RTH 2,000 |
| Product Code | SR3 | SR1 |

US 11,386,486 B1

AUTOMATED AND RELIABLE DETERMINATION OF A FORWARD VALUE ASSOCIATED WITH A FUTURE TIME PERIOD BASED ON OBJECTIVELY DETERMINED EXPECTATIONS RELATED THERETO

BACKGROUND

An interest rate is the price of money. A backward interest rate is price of money for time period prior to the time that the rate is set, e.g. for the prior day also referred to as an overnight rate. A forward interest rate is the price, determined at the time the rate is set, of money for a future time period, e.g. the rate represents today's cost of future money. Short term interest rates are interest rates typically used for debt with future maturities less than one year from the current date and are typically administered by the central banks of nations, where, as will be explained, the different rates set by different national institutions may be used for different purposes. As opposed to short term interest rates, long term interest rates, for use with debt having maturities greater than 1 year, are typically set by market forces, i.e. through the bilateral negotiations of self-interested parties looking to transact based on the interest rate. Two examples of national institutionally set short-term interest rates are the Federal Funds ("Fed Funds") rate and the London Interbank Offered ("LIBOR") rate.

The Federal funds rate is the rate at which U.S. banks lend money to each other overnight. The money in question is the reserves that sit in their bank accounts in the Federal Reserve system. If Bank A has excess reserves at the end of the day and Bank B has a reserve deficit at the end of the day (reserves are the money they have to keep on hand—electronically, at least—in case people ask for it; reserve requirements are set by the Federal Reserve), Bank A will loan the money to Bank B for a period of one day. The rate of interest Bank A will charge is the Federal funds rate.

The actual federal funds rate is set by the open market as banks loan each other money from day to day. The federal funds rate "target," on the other hand, is set by the Federal Open Market Committee ("FOMC"), which is headed by the Federal Reserve Chairman. Generally, when commentators refer to the federal funds rate, they're usually referring to the target rate set by the Fed, rather than to the actual federal funds rate. The FOMC meets every few months and decides whether to raise the federal funds rate target, lower it or keep it as is.

The target rate is used as a tool to help control the nation's money supply and promote employment. For example, if inflation begins to run above the Federal Reserve's target rate, the Fed may choose to raise the federal funds rate target. By doing so, the Fed is restricting the amount of money that's available to banks, making it more likely that they'll raise interest rates on commercial and consumer loans. That, in turn, should help control the prices of goods and services by dampening commercial activity. Meanwhile, if the U.S. economy is sputtering and unemployment is high, the Fed may choose to lower the federal funds rate target in order to help bring borrowing costs down and encourage businesses and consumers to spend.

The Fed Funds rate is a backwards looking rate in that it is an aggregation of data from the prior day. That is, as opposed to being predetermined at the start of a time period, the Fed Funds rate is computed based on previously occurring events. Interest rate futures contracts which are based on the Fed funds rate are typically defined to settle at the end of a month based on the average effective Fed Funds rate occurring each day over that month of settlement. Accordingly, while one may not know the settlement price until the settlement date, as the settlement date draws nearer, the settlement price becomes more and more certain.

The London Interbank Offered Rate ("LIBOR") is an interest rate benchmark used as a reference rate for transactions. This reference rate reflects the general cost of large banks' borrowing that is not backed by collateral. U.S. dollar LIBOR plays a central role in the U.S. financial markets and economy. It is used to set interest rates on financial products such as mortgages and private student loans. Unlike the federal funds rate, which only applies to U.S. banks, the LIBOR is a London-based international interest rate benchmark used around the globe.

The difference between LIBOR, formerly known as the London Interbank Offered Rate and now ICE LIBOR (Intercontinental Exchange LIBOR), and benchmark rates that reflect minimal credit risk, is used as a measure of risk in banks and stress in financial markets.

LIBOR is an average of the estimated interest rate that a high quality bank in London would be charged to borrow from other leading banks. In particular, a sample of multiple, e.g. 16, banks, including Barclays, Chase, Citi, HSBC and Bank of America, report to the British Bankers' Association how much interest they expect to be charged by other banks for a short-term loan. Banks' interest rate estimates aren't required to be based on actual transactions. However, the banks are expected to give their best guesses.

In essence, LIBOR is a short-term unsecured interest rate charged between banks for wholesale funding. However, LIBOR is also the primary benchmark for short-term interest rates around the world. LIBOR rates are calculated for five currencies and seven borrowing periods ranging from overnight to one year and are published each business day. Daily LIBOR interest rate fixings have been published since Jan. 1, 1986 and have since become deeply entrenched into the global financial markets. Many financial institutions, mortgage lenders and credit card agencies set their own interest rates relative to LIBOR. In fact, over $350 trillion dollars' worth of financial derivative contracts, mortgages, bonds and retail and commercial loans have their interest rates tied to LIBOR. Most consumers probably have at least one financial instrument, such as a mortgage, home equity line of credit, or business loan that has an interest rate tied to LIBOR.

While most small and mid-sized banks borrow federal funds to meet their reserve requirements—or lend their excess cash—the central bank isn't the only place they can go for competitively priced short-term loans. They can also trade Eurodollars, at the LIBOR rate, which are U.S.-dollar denominated deposits at foreign banks. Because of the size of their transactions, many larger banks are willing to go overseas if it means a slightly better rate. For example, the 3 month US Dollar (USD) LIBOR interest rate is the average interest rate at which a selection of banks in London are prepared to lend to one another in American dollars with a maturity of 3 months.

Post financial crisis regulation has significantly reduced bank appetite to issue commercial paper and wholesale deposits. As such, there is now a very low volume of transactions for banks to base their LIBOR submissions and as a result, banks must rely upon their "expert judgement" translating other interest rates into a LIBOR rate. In fact, submissions based upon "expert judgement" as opposed to real transactions now make up 70% of the daily three-month LIBOR submissions according to Barclay's Bank. The liability associated with generating such an important and highly utilized interest rate based upon expert judgement is enormous, especially in the wake of the LIBOR fixing scandals. During this scandal, it was discovered that some banks were falsely inflating or deflating their rates in order to profit from trades or to give the impression that they were more creditworthy than they actually were. Accordingly, a replacement for LIBOR is needed.

Removing and replacing LIBOR is an enormously complicated task. While there are trillions of dollars' worth of financial instruments that reference LIBOR, the largest complication rests is those financial assets and those financial contracts that have a maturity beyond the 2021 deadline. As it relates to futures and derivatives contracts, ISDA master agreements between counterparties will have to be amended or replaced. Retail mortgages, home equity lines of credit, and any other consumer or business debt tied to LIBOR will have to be amended unless a back-up interest rate index is referenced in the original documentation. Mortgage backed securities, loans and floating rate bonds all tied to LIBOR will have to be addressed contractually, and with regard to deal specific covenants, may require consents from the owners of these securities. In addition, as previously discussed, all of the parties involved will need to come to some consensus that the compensating spread, i.e. between LIBOR and the rate/system which replaces it, is fair and reflective of the original interest rate and credit risk imbedded within LIBOR.

The Federal Reserve Board and the Federal Reserve Bank of New York convened the Alternative Reference Rates Committee (ARRC) to identify an alternative to LIBOR. The OFR is a member of ARRC and has collaborated with the Federal Reserve and the Federal Reserve Bank of New York to develop three new rates. In June 2017, the ARRC selected one of these rates, the Secured Overnight Financing Rate (SOFR), as its recommended alternative to U.S. dollar LIBOR.

The SOFR is based on repo interest rates. A repo, or repurchase agreement, is a secured loan; one party sells a security to another party and agrees to repurchase it later at a set date and price. Because repos are a key source of short-term funding in the financial system, a rate based on these transactions is a good candidate for an alternative reference rate. The SOFR, like the Fed Funds rate, is a one day overnight rate and is the daily average rate for repo transactions secured against US treasuries. It measures the rate on average traded notional value.

The SOFR will include overnight, Treasury-backed repo transactions that take place in the Bank of New York Mellon's triparty repo system or are cleared through one of two Fixed Income Clearing Corporation platforms: (1) the Delivery-Versus-Payment Repo Service and (2) the General Collateral Finance (GCF) Repo Service.

A Bank of England working group approved SONIA as its preferred short-term interest rate benchmark thereafter. The SONIA index tracks the rates of actual overnight funding deals on the wholesale money markets, rather than relying on submitters like the Libor benchmark does. SONIA's use will minimize "opportunities for misconduct,"

As both SOFR and SONIA look at prior transactions, e.g. repo transactions or overnight funding agreements, to set their rates, they may also be considered "backward" looking rates as discussed above. However, LIBOR, being based on projected transactions, and predetermined at the start of a time period, may be considered a "forward" looking rate. It may be advantageous, then, to replace LIBOR with a similar forward looking alternative.

Furthermore, while computers may be used as tools in determining LIBOR, the underlying survey methodology at its core render the process one which cannot be fully automated and objectively calculated and will necessarily always comprise a bias-able and/or manipulatable underlying component necessitating significant regulation and oversight.

BRIEF DESCRIPTION OF THE DRAWINGS

FIG. 5 depicts a block diagram a system for automatically determining a forward interest rate value for one or selected future time periods.

FIG. 8 depicts a table describing an example definition of one and three month SOFR futures contracts for use with the system of FIG. 5

DETAILED DESCRIPTION

Figure 1:
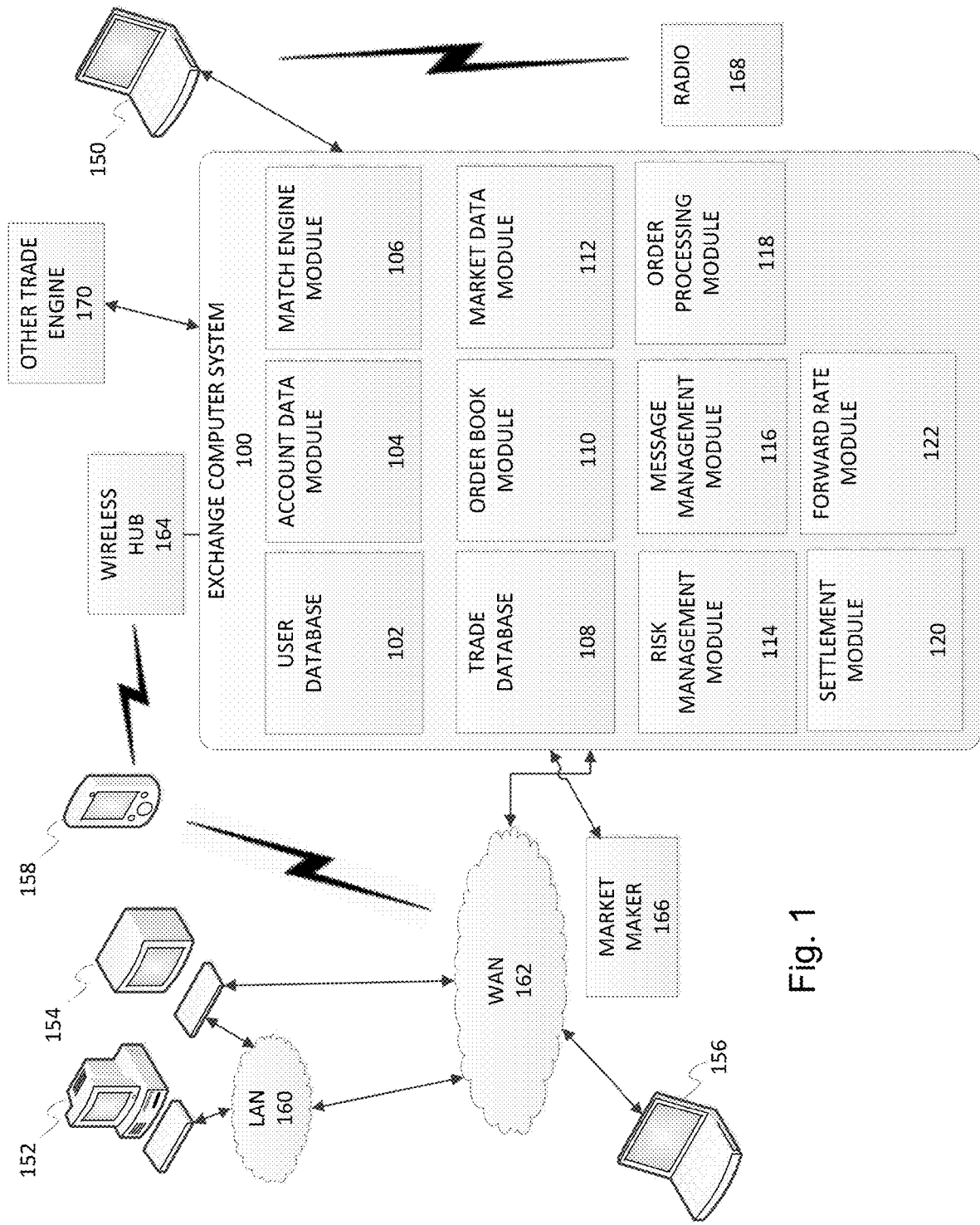
FIG. 1 depicts a computer network system, according to some embodiments.

The disclosed embodiments relate to computation of a forward interest rate for a select future time period subsequent to a current date. In particular, the disclosed embodiments determine a current price for each of a set of interest rate futures contracts having consecutive expiration months which collectively include the selected future time period, and based thereon compute an implied interest rates for each of the consecutive expiration months. The disclosed embodiments further account for days within the select period where the interest rate may vary for reasons other than the transaction of the set of futures contracts, i.e. other than for reasons related to supply/demand, such as due to governing authority policy changes. In particular, the disclosed embodiments may determine whether any of the consecutive expiration months include a day on which an interest may change based on an event unrelated to transactions involving any of the set of interest rate contracts, and for each of the expiration months determined not to include a day on which an interest may change based on an event unrelated to transactions involving any of the set of interest rate contracts, compute a baseline interest rate for each day of the expiration period determined not to be affected by transactions involving any of the set of interest rate contracts and compute an adjusted baseline interest rate for each day of the expiration period determined to be affected by transactions involving any of the set of interest rate contracts. For each of the expiration months determined to include a day on which an interest may change based on an event unrelated to transactions, starting with the expiration month nearest or furthest away from the current date, the disclosed embodiments iteratively extrapolate from the baseline and adjusted baseline interest rates for the days of the prior or subsequent month forward/backward day by day to determine extrapolated interest rate values for each day of the expiration month from the last day thereof until the day on which an interest may change based on an event unrelated to transactions, and derive a derived interest rate, based on the extrapolated rates and the overall implied interest rate for the month, for each day from the beginning of the expiration month determined to include a day on which an interest may change based on an event unrelated to transactions up to the day on which an interest may change based on an event unrelated to transactions. The disclosed embodiments then determine an initial interest rate value accorded to the current day and compute the forward interest rate for the select future time period by combining, such as by averaging or compounding, the initial interest rate value, baseline interest rate value, adjusted baseline interest rate value, extrapolated interest rate value or derived interest rate value for each day of the select future time period.

The disclosed embodiments enable automated determination of a stable, replicatable and risk-free short term forward reference rate which may be predetermined at the start of a time period and which further eliminates the inherent issues with LIBOR discussed above.

The disclosed embodiments utilize data observed or otherwise derived from the trading of futures contracts having short term interest rate based underliers, e.g. based on overnight interest rates, and, in one embodiment, are integrated with an electronic transaction processing system, e.g. an electronic trading system, to access data indicative of the trading thereof, and therefore avoid reliance upon subjective/opinion inputs. The disclosed embodiments enable generation of rates for varying forward terms, e.g. 1, 2, 3, 6 or 12 months using the observed prices of a set of suitable futures contracts, e.g. data indicative of the symbiotic market driven negotiated estimates/consensus of capitalistic/self-motivated traders of multiple overlapping short term backward looking interest rate products. Inherent biases, being a necessary and visible part of any market, are eliminated via the negotiated and transparent operation of the transaction processing system based on upon which the disclosed embodiments derive the automatically determined forward short-term interest rate.

The disclosed embodiments may be operated on a daily basis using a rolling set of inputs to provide continuously updated projections for the desired terms.

As the disclosed system utilizes data collected from the trading of futures contracts, it may be implemented in conjunction with electronic data transaction processing system which implements an electronic trading system, described below, which processes data transactions comprising trades for futures contracts.

As will be described, in one embodiment, the prices of Fed Funds futures contracts are utilized. Fed Funds futures contracts are a way for one, via the price they pay for the contract, to assess or hedge the future Fed Funds overnight rate, e.g. to hedge against or speculate on changes in short term interest rates. Essentially, traders buy these contracts when rates are expected to fall and sell them when rates are expected to rise and, accordingly, the price of a given Fed Funds futures contract, being the negotiated price as between the transacting parties, represents what traders think will happen to the rate in the near future, not what it is right now. Generally, for contracts which expire in the current month, the price of the contract is equal to the weighted average of the actual fed rates realized to date and expected rates for the remainder of the month: as the expiration/settlement date approaches, the contract price varies less on expected rates and is determined primarily by the realized rates during the month. Accordingly, FOMC actions that occur in middle of delivery month may have little impact on price as the price factors in rates already realized except where the FOMC may make an unexpected change in rates and the remaining unrealized rates differ from those already realized. In contrast, a contract expiring in the month after a fed meeting more fully expresses market expectations as, for deferred expirations, the price is based on the average expected fed rate for the expiration month, i.e. completely based on expected rates. Therefore, the disclosed embodiments leverage the price of Fed funds futures contracts for different months so as to determine how the market expects the federal funds rate to move over time and automatically predict the cost of money beyond the current date.

In one embodiment, a process for automatically computing a forward interest rate for given term may include converting the prices of each of a set of futures contracts with periods (from initial trading to expiration) spanning the desired term, such as the fed fund futures contracts described below. For example, when the price is in the format of 98.75, one may convert that to a yield or an interest rate by subtracting that number from 100, i.e. 100 implies 0%, so for 100-98.75 (which is the futures price) the implied rate would be 1.25% over the term of that futures contract. Basically, the futures price and interest rate are inversely related, i.e. if the futures price goes up, the yield or interest goes down and vice versa, and if the futures price goes over 100, you will get a negative interest rate.

Next, the computed interest rate for each contract is broken down into a baseline rate and different seasonal/turn adjustment rates which are used to accord each day of the expiration month of the contract with an applicable interest rate, e.g. if the end of the month is on a Sunday, then the Friday night, Saturday night and Sunday night overnight rates may all be considered to be a turn period and turn rates for those 3 days out of the 30 day contract period—if the futures contract is a 30-day contract, the overnight rates for 3 of those days would be adjusted to a seasonal or turn rate, while the remaining 27 days would be accorded the baseline rate, wherein the combination of the turn-adjust and baseline overnights rates for all days in the period would result in the computed implied rate described above. Generally, a turn-date is one on which there is a regular/predictable change in the rate, either up or down, from the baseline rate for that day, which then reverts back to the baseline rate on the next non-turn date. Typically, the rate for a turn-date drops relative to the baseline rate due to a drop in demand, e.g. for money. FOMC, or other interest rate governing authority, meeting dates, on the other hand, are not considered turn-dates as they either result in no change to the baseline interest rate or a complete change thereto, i.e. one that does not revert back to baseline rate thereafter.

The determination of which days of a given period would be considered adjustable "turn-dates," as well as the adjustment to apply to the overnight rates for those dates, may be determined in advance, such as based on dates known to have rates which deviate from the baseline as well as date which, based on historical data, have shown to have rates which deviate. For example, it is well known that the federal funds rate drops at the end of every month by about 9-10 points. Those drops may be considered distortions and the disclosed methodology accounts for those distortions and adjusts the baseline rate based on the distortions so that the end result is the interest rate that corresponds to the futures price. Other dates which may be considered known turn-dates, aside from month-end, may include quarterly US tax deadlines, treasury coupon dates, treasury auction settlement dates, etc. With regards to additional turn dates, other than known turn dates, for example, one may look at historical daily overnight rates and identify those dates, such weekend days, etc. where the rate deviated from other the rates of other dates, in manner that indicated a significant change in supply/demand conditions so as to affect the baseline rate. For example, based on historical daily overnight rates, a turn-date may be defined as a date on which the overnight rate deviates from the rate of the prior day, or an average of a defined number of preceding days, by more than a threshold percentage, such as 10%, or more than a threshold number of standard deviations, such as 1.

While the underlying contract term of each futures contract used by the disclosed methodology will be monthly, the disclosed system is capable of computing a forward rate for different terms, e.g. 1 month, 3 months, 6 months, 12 months, similar to the terms for which LIBOR rates are made available.

The baseline rate, in combination with the turn rates accounting for seasonal irregularities in supply and demand as evidenced by deviations in the interest rates from baseline values, creates a model for what the forward rates will be including adjustments. This allows for the creation of a short-term forward rate, i.e., one can take the first 90 days to create a 3-month benchmark and 180 days to create a 6-month benchmark, etc. Essentially, the disclosed embodiments utilize the baseline and seasonality rates that are based on 1-month contracts, i.e. contracts whose settlement value is computed at the end of the expiration month based on the underlie rates for each date of that month, and then using consecutive 1-month contracts to create a product that has varying terms such as 3-month, 6-month, etc. Note that if one were to apply the disclosed process during the middle of a month, the process may require four, consecutive, one month contracts to determine a 3 month rate, seven consecutive one month contracts to determine a 6 month rate, 13 consecutive one month contracts to determine a 12 month rate, etc.

Figure 7:
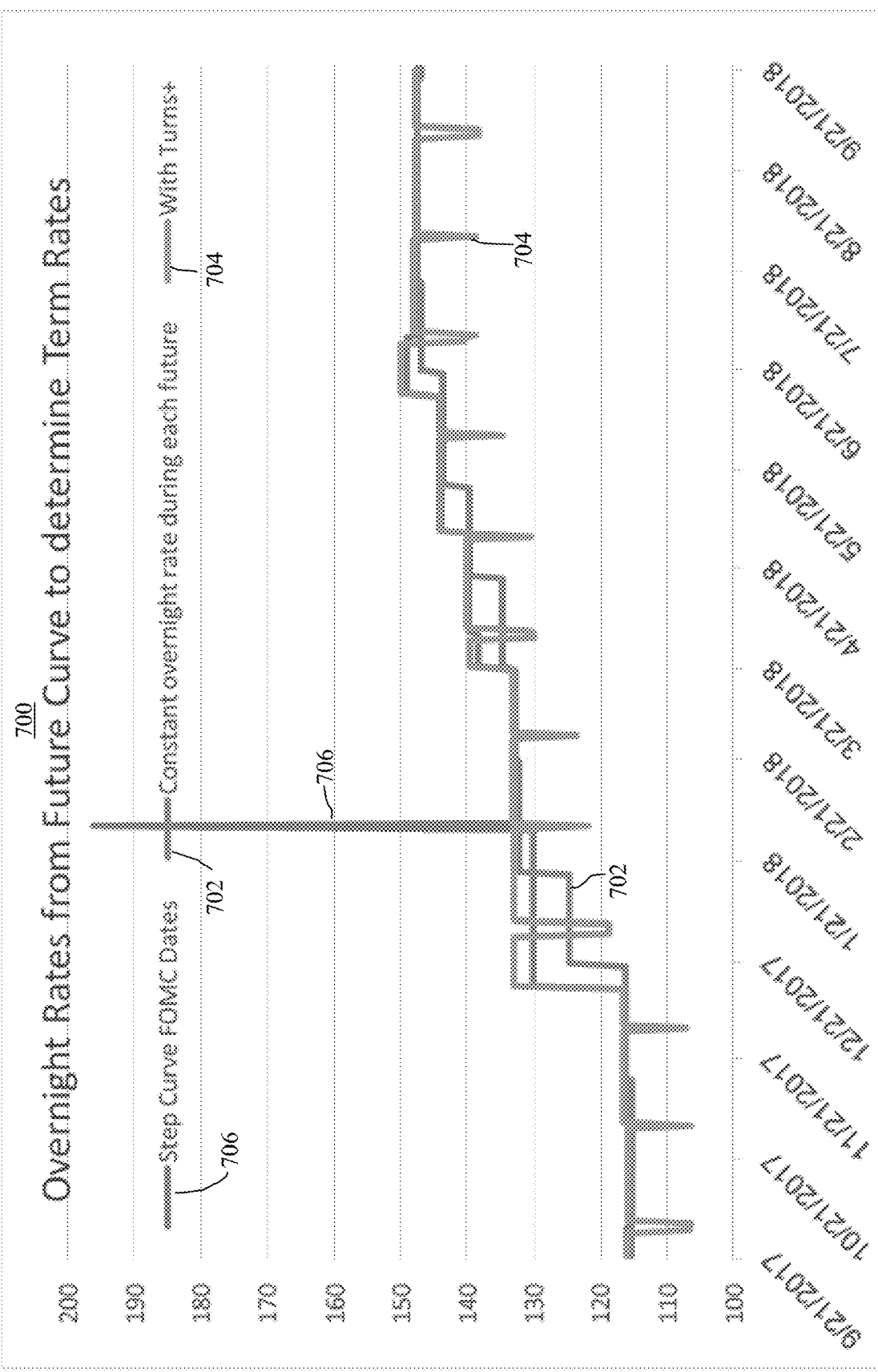
FIG. 7 depicts a graph of example outputs of the system of FIGS. 5 and 6 for an example time period.

Referring now FIG. 7, there is shown an example output 700 of the disclosed embodiments showing computed forward interest rates as of Sep. 21, 2017. The orange line 702 depicts the constant overnight rate during each futures period and depicts jumps wherever there are futures prices changing at the end of every month. The blue line 706 depicts the discrete changes in the interest rate that occur on FOMC meeting dates and acts as a step/multiplier to force rate changes to occur on those meeting dates. Gray line 704 depicts the adjusted rate (the discrete FOMC interest rate changes (blue 706) modified to include turn dates and baseline rates) factoring in the turn dates and their corresponding overnight rates and depict spikes downward showing the turns.

More particularly, the disclosed system/method for automatically computing one or more forward short-term interest rates for a current day may include the following inputs:

Current/prevailing futures prices for a set of relevant futures contracts. In one embodiment, the selected contracts must be liquid/readily tradeable and the periods for all of the contracts, i.e. the time from initial trading until expiration, should collectively cover the time period for which one wishes to generate forward rates. For example, but not limited to, one may utilize "30 day Federal Funds Futures", monthly SOFR futures (to be designed), monthly Sonia futures, monthly Eonia futures, etc., or combinations thereof, having an initial trading date that is within 13 months of the current date, e.g. to project forward rate for up to the next 12 months. It will be appreciated that "strips" of the above contracts, i.e. consecutive contracts transacted in a single transaction, e.g. 3 month quarterly contracts, may also be used. For example, as 30 day Fed Funds futures contracts, on any given date, are available expiring in the current month and at least next 36 months, one may select the contract expiring in the current month and those 12 contracts expiring in each of the next consecutive 12 months. Where strips are used, they may be combined with available monthly contracts, used, due to their granularity, in the front/earlier months, to cover the necessary forward time period. In one embodiment, the current/prevailing prices of each contract, which are not yet expired and may still be continued to be traded, may be determined using volume weighted average price (VWAP), time weighted average price (TWAP), or a combination thereof, where VWAP, a measure of the average price at which a contract is traded over the trading horizon, is the ratio of the value traded to total volume traded over a particular time horizon (which is implementation dependent and in some implementations may be as little as 15 minutes), and TWAP is the average price of a security over a specified time. It will be appreciated that other methodologies/mechanisms for determining prevailing futures contract prices may be utilized, alone or in combination, such as the end of day settlement procedures of the electronic trading system, a market snapshot (derived from executing the settlement procedures at another time other than the settlement time), or other method/mechanism now available or later developed, or a combination thereof.

Identification of dates requiring adjustment for seasonality or "turn" and the Seasonal or Month-end Turn adjustment value for those dates: For example, known turn dates include month-end whereas other turn dates may be identified based on historical data. The adjustment values for all of the turn dates may then be determined based on historical data. For example, if one defines the lookback period as 1 year, known turns always occur at month ends, e.g. they run between business dates, thus begin on the last good business day of a month and end on the first good business day of the following month. By reviewing historical data, additional turn dates may be identified. For example, for each month end in the preceding 12 months one looks at daily observed rates for the turn period as defined here and compare with the average of the day previous to the turn and the day following the turn. The difference is defined as the average for that period. Finally, the average over the 12 observations is computed.

Starting point value: this is the first data point in the model used by the disclosed embodiments and is the interest rate applied to the period between the current date (today) when the forward rates are being determined and the next day (tomorrow).

Start and End dates of each of the futures contracts in the relevant set: the initial trading and settlement/expiration dates of each futures contract in the set being relied upon.

The disclosed system/method may then operate as follows:

The current/prevailing futures prices of each contract in the set being relied upon is converted to an implied interest rate for the expiration period of the contract by, for example, subtracting the price (computed using VWAP and/or TWAP) from 1 (or 100). As noted above, the interest rate for a fed funds futures contract will be the overall rate for the expiration month of the particular contract determined at the end of that month (the aggregate of the fed funds overnight rate for each day of the month). Different futures contracts may be used which have different period over which the settlement interest rate is determined. Prior to expiration, the expected or implied interest rate for the expiration may be derived from the current price.

Each implied interest rate is then broken down into a baseline rate and a turn/seasonal adjusted rate as follows:

Total number of days ($D_T$) in the expiration month;

Number of adjustable, e.g. "turn," days ($D_a$). Known and additional turn days are defined in advance based on historical data, e.g. the last 1 or 2 days of a month, as well as other days, where supply/demand conditions may affect the baseline rate.

Interest Rate projected at contract expiration implied by future ($R_f$). As described above, this represents the total interest rate returned or expected to be returned. This is combination of a baseline rate occurring on normal days of the expiration period and turn adjusted rates occurring on defined turn days of the expiration period. This interest rate, calculated/implied from the price as described above, represents a constraint in that during any futures period, i.e. the time between being initially offered for trading and the expiration, the combination of baseline rates and seasonal/turn adjusted dates must return the overall rate implied by the price of the future (whether by linear average or compounded average in the case a future is so defined).

Turn adjustment (A) defined in advance based on historical data, e.g. derived from an average based on a periodic look back of previous instances. For example, if the turn adjustment is negative (in a rate sense) i.e., making the interest rate lower on turn days then the baseline must be higher to compensate and return the all-in rate implied by the futures price.

Solving for Baseline rate ($R_b$) and Turn adjusted rate ($R_a$):

$R_f = [D_a \cdot R_a + (D_T - D_a) \cdot R_b]/D_T$

And therefore:

Baseline Rate $R_b = [R_f \cdot D_T - D_a \cdot A]/D_T$

Turn-Adjusted Rate $R_a = R_b + A$

Once completed for all 13 contracts, a set of 13 $R_a/R_b$ values is established along with the non-adjustable and turn dates for all calendar days of the 13 month window. In one embodiment, the system may except as inputs, the baseline rate $R_b$ and the turn adjustment A to be applied thereto, rather than the computed turn adjusted rate $R_a$.

The starting point rate for the current month, i.e., the period of time from, but not including, the current date to the end of the current month, is determined by aggregating, e.g. averaging, the known fed funds effective overnight rates from the beginning of the month up to the current date. The rates known to-date essentially define the daily rates left to be determined for the current month. These known rates are factored into the overall baseline rate $R_b$ and turn adjusted rate $R_a$ for the current month, i.e. knowing the implied rate $R_f$ based on the futures contract price for the month, along with the average of the known interest rates to date, the implied interest rates for the remaining days of the month may be computed knowing that the overall average must equal $R_f$. The derived rate for the remaining days of the month is used as the $R_b$ value and adjusted for any turn date within those remaining days.

Baseline rates $R_b$ and turn adjusted rates $R_a$ are then accorded to each calendar day of the remainder of the current month and to each calendar day of the upcoming 12 months according to the following process.

First, as noted above, a baseline starting point rate is determined for the current day (as opposed to the rest of the remaining days of the month for which the $R_b$ was calculated as described above) by considering the prior day's, i.e. yesterday's, fed funds overnight rate which provides a starting point for today's rate. It is also determined whether or not today is a turn date. If today is a turn date, a turn adjustment A is applied to the prior days rate to adjust for the turn. This rate, turn adjusted if necessary, then acts as a starting point on the curve.

Next, it is determined which of the current month and the subsequent 12 months do or do not contain a central bank or other monetary policy setting administration/committee, e.g. FOMC, meeting date. At these meetings, the participants determine whether or not to effect a change in policy affecting overnight rates. Accordingly, it is at these times that interest rates may or may not change, in manner unrelated to supply/demand, i.e. unrelated to the transactions of the futures contracts, i.e. prices, covering the period, potentially creating discontinuities in the rates prior and subsequent to these meetings which are determined based on the futures contracts transactions, i.e. prices, as described. As meeting dates are dates on which the rates can change, but may not, based on events other than the transactions of the requisite futures contacts, they are not treated the same as turn dates where, based historical data related to past transactions, the rates do change.

For example, the FOMC currently has 8 meeting scheduled per year thus there are months that do not contain meetings. The schedule for 2017, for example, was: January 30-31, March 20-21, May 1-2, June 12-13, July/August 31-1, September 25-26, November 7-8 and December 18-19. Announcements are made on the second day of meetings and this is therefore the pertinent single day, thus the July/August meeting above is deemed to occur in August with July then being deemed to be a non-meeting month. More obviously, in addition to July, there are no meetings in February, April and October. It will be appreciated that the meeting dates, and therefore which months are determined to be meeting months and non-meeting months, may vary year to year. Further, in any given year there may be more or fewer meetings. Finally, depending upon the set of instruments being utilized by the disclosed embodiments, the designation of what constitutes a meeting may vary.

For each non-meeting month, the baseline rate $R_b$ and turn adjusted rate $R_a$ calculated for the particular contract expiring in that month are accorded to the non-adjustable and turn days respectively.

In the disclosed embodiments, the interest rate model is constrained such that any jumps in interest rates occur discretely on the meeting dates. In other words, when considering the baseline rates $R_b$ and turn adjusted rates $R_a$ accorded to the days in the month preceding a meeting month and the month subsequent to that meeting month, any change, e.g. discontinuity, there between will be deemed to occur on the meeting date.

In particular, with a starting point forward rate and the forward rates for all days of each non-meeting month defined, this leaves 8 months for which to compute the forward rates. For these 8 meeting-months, there are days before the meeting date and days after the meeting date for which a rate must be accorded.

Generally, starting with a non-meeting month, the baseline rate for that month is extrapolated forward into the subsequent meeting month up to the meeting date, and/or backward into the prior meeting month up to the meeting date. With the extrapolated rates accorded then to the days of the meeting month on one side of the meeting date, the rate accorded to each day on the other side of the meeting date is projected using the implied rate from the futures price for the month. In particular, using the baseline rate $R_b$ and turn adjusted rate $R_a$ for the non-meeting month immediately preceding or following a meeting month, those rates are extrapolated either forward or backward, from the end of the subsequent, or beginning of the prior, non-meeting month at that month's same rate, up or back to the meeting date within the meeting month so as to fill in the front or back half of the meeting month. In order to accord rates to the days of the remaining half of the meeting month following or preceding the meeting date, the effective implied rate for the entire meeting month is calculated based on the rates applied to days of the remaining half and the computed implied interest rate of the futures contract expiring in that month, e.g. the aggregate of the rates accorded to all of the days of the month. As the aggregate of the accorded rates for each day of the month should equal the computed implied interest rate for the futures contract expiring that month, if the implied rate is known along with the accorded rates of one half of the month, the accorded rates for the days of the remaining half of the month may be computed therefrom. The rates for the all of the days of the 8 meeting months are then similarly determined via the solution of a set of similarly determined equations, e.g. a closed form solution to a quadratic program. In this manner rate changes, i.e. actual changes in the rate as opposed to turn-based aberrations, are constrained to occur on the meeting date of the meeting date months.

With the daily forward rates accorded to every calendar day forward of the current out to 13 months, term rates for desired forward terms may be computed. For example, to determine the 1, 2, 3, 6 or 12 month term rates, one may average, or, alternatively, compound, the daily rates for the desired term.

Each day until the subsequent month is reached, the above computations may be repeated with the then current prices of the same set of futures contracts, wherein once the next month is reached, the set of futures contracts is adjusted to drop the oldest month and add the month that is now 13 months out to maintain 13 months of coverage, i.e. the set of futures contracts is rolled forward on a monthly basis to continuously cover the future time period(s) for which forward rates are to be computed. In this way, the disclosed embodiments produce a continuous stream of forward term rates.

The disclosed embodiments may operate automatically to compute forward interest rate value for selected time periods based on the overlapping consecutive expiration periods of substantially continuously traded interest rate futures contracts which objectively capture unbiased expectations adjusted to account for known anomalies. As opposed to merely defining rates for all time periods between FOMC meeting dates, with adjustments to minimize change of rate other than at FOMC meetings, the disclosed embodiments, while similarly constraining overnight rates to being constant between FOMC meetings, first declare rates in months that do not have meetings and then extrapolates forwards and backwards or bootstraps to fill in the gaps. This disclosed embodiment additionally implements turn adjustments in order to better represent the actual market and mitigate against the possibility of an undesirable solution (where the calculated overnight rates jump excessively). Accordingly, the disclosed embodiments need not an adjustment function or use of a quadratic program solver.

The disclosed technology addresses the need in the art for a system which can operate automatically without subjective inputs. Specifically, the disclosed technology solves a problem that uniquely arises in the fields of computer technology and exchange computing systems, where forward values need to be computed based on objectively obtained data rather than manually generated subjective/opinion data. For example, by interfacing with an electronic trading system and utilizing data indicative of the results of the trading of particular futures contracts, the system may determine objective expected interest rate values determined via the negotiations between self-interested parties and utilize this data to generate an interest rate model for an overall future time period from which interest rate values for particular sub-periods may be derived. Thus, the disclosed solution is rooted in computer technology in order to overcome a problem specifically arising in the computer systems used by electronic trading systems. Indeed, the subject technology improves the functioning of the computer by allowing it to automatically generate data it could not generate previously.

The disclosed embodiments are drawn to systems and methods that include specific computing components, each being specially programmed to perform a technological function as part of a greater technological process. The disclosed embodiments include separate system components interconnected in a specific way to implement aspects of the disclosed system and include sufficient specific structure and function and, as such, are not drawn to an abstract idea.

The disclosed embodiments are not directed to any method for "obtaining, transforming and determining," which is involved in all computing functionality. The disclosed embodiments and features recited in this regard provide numerous advantages. The instant embodiments do not preempt all methods of "obtaining, transforming, and determining," and are specifically directed towards the disclosed functionality. The disclosed embodiments implement specific rules and features that improve the operation of a particular genus of a technological process, which does not preempt all techniques of obtaining, transforming and determining, which, at some level, is part of every computing process.

The disclosed embodiments may be implemented in an electronic data transaction processing system, as described below, that processes data items or objects, such as an exchange computing system as described in more detail below. Customer or user devices (e.g., client computers) may submit electronic data transaction request messages, e.g., inbound messages, to the data transaction processing system over a data communication network. The electronic data transaction request messages may include, for example, transaction matching parameters, such as instructions and/or values, for processing the data transaction request messages within the data transaction processing system. The instructions may be to perform transactions, e.g., buy or sell a quantity of a product at a range of values defined by equations. Products, e.g., financial instruments, or order books representing the state of an electronic marketplace for a product, may be represented as data objects within the exchange computing system. The instructions may also be conditional, e.g., buy or sell a quantity of a product at a given value if a trade for the product is executed at some other reference value. The data transaction processing system may include various specifically configured matching processors that match, e.g., automatically, electronic data transaction request messages for the same one of the data items or objects. The specifically configured matching processors may match, or attempt to match, electronic data transaction request messages based on multiple transaction matching parameters from the different client computers. The specifically configured matching processors may additionally generate information indicative of a state of an environment (e.g., the state of the order book) based on the processing, and report this information to data recipient computing systems via outbound messages published via one or more data feeds.

The application may be executed by one or more of the matching processors. Thus, the application may be a software match engine module, such as the match engine module illustrated in FIGS. 4A and 4B, which includes multiple different stages, e.g., the conversion component 402, match component 406, and publish component 410.

Futures Exchange

A Futures Exchange, referred to herein also as an "Exchange", such as the Chicago Mercantile Exchange Inc. (CME), utilizing an Exchange Computing System, described in detail below, provides an electronic data processing system which implements a contract market where futures and options on futures are traded. Futures is a term used to designate all contracts for the purchase or sale of financial instruments or physical commodities for future delivery or cash settlement on a commodity futures exchange. A futures contract is a legally binding agreement to buy or sell a commodity or other underlier, such as a financial instrument, at a specified price at a predetermined future time. An option is the right, but not the obligation, to sell or buy the underlying instrument (in this case, a futures contract) at a specified price within a specified time. The commodity or instrument to be delivered in fulfillment of the contract, or alternatively the commodity/instrument for which the cash market price shall determine the final settlement price of the futures contract, is known as the contract's underlying reference or "underlier." The terms and conditions of each futures contract are standardized as to the specification of the contract's underlying reference, the quality of such underlier, quantity, delivery date, and means of contract settlement. Cash Settlement is a method of settling a futures contract whereby the parties effect final settlement when the contract expires by paying/receiving the loss/gain related to the contract in cash, rather than by effecting physical sale and purchase of the underlying reference at a price determined by the futures contract price.

In particular all futures contracts may be characterized by at least a date of first availability, i.e. the first day on which the contract may be traded, and an expiration date when the contract will be settled. The time between the first availability and the expiration may be referred to as the contract life or lifespan.

An interest rate futures contract, also referred to as an interest rate future, is a futures contract having an underlying instrument/asset that pays interest, for which the parties to the contract are a buyer and a seller agreeing to the future delivery of the interest bearing asset, or a contractually specified substitute. Such a futures contract permits a buyer and seller to lock in the price, or in more general terms the interest rate exposure, of the interest-bearing asset for a future date. One example of an interest rate futures contract is a short term interest rate ("STIR") contract. Examples of such short-term interest rate ("STIR") futures include CBOT 30-Day Fed Funds futures, CME 1-Month Eurodollar futures, 3-Month Eurodollar futures, or 3-Month Overnight Interest Rate Swap ("OIS") futures, and NYSE Liffe Eonia futures, Eonia Swap Index futures, or Short Sterling futures. As described above, these are backwards looking futures contracts as opposed to futures contracts based on forward looking rate, e.g. Eurodollar futures based on Libor.

With regards to futures contracts based on backwards looking rates, e.g. Fed Funds Futures, in addition to being characterized by a first availability and an expiration, interest rate futures may be further characterized by a duration over which the subject interest rate will be calculated, e.g. averaged, for the purpose of determining the final settlement price. Typical durations are monthly and quarterly. So for a monthly interest rate contract, average interest rate during the expiration month will be calculated to determine the final settlement price for that contract and for a quarterly contract, the average interest rate for the quarter at the end of which the contract expires, will be calculated to determine the final settlement price, etc.

One purpose of interest rate futures contracts may be to achieve synthetic interest rate swap exposure through use of interest rate futures that directly reference the short-term interest rate that serves as the floating rate benchmark for the interest rate swap. The market participant may construct a futures proxy for the desired interest rate swap exposure with strips of such futures, i.e., sequences of STIR futures contracts with consecutive delivery months. For example, a market participant might use CME 3-month Eurodollar futures in each of the nearest 40 quarterly delivery months, in varying quantities, to synthesize a 10-year US dollar interest rate swap. Similarly, varying amounts of CBOT 30-Day federal funds futures for each of the nearest 12 monthly delivery months might be combined to create a synthetic proxy for a 1-year US dollar overnight index swap.

Typically, the Exchange provides for a "clearing house" through which all trades made must be confirmed, matched, and settled each day until offset, i.e. closed or otherwise nullified by an opposing position, or delivered. The clearing house is an adjunct to the Exchange, and may be an operating division of the Exchange, which is responsible for settling trading accounts, clearing trades, collecting and maintaining performance bond funds, regulating delivery, and reporting trading data. The essential role of the clearing house is to mitigate credit risk. Clearing is the procedure through which the Clearing House becomes buyer to each seller of a futures contract, and seller to each buyer and assumes responsibility for protecting buyers and sellers from financial loss due to breach of contract, by assuring performance on each contract. A clearing member is a firm qualified to clear trades through the Clearing House.

As an intermediary, the Exchange bears a certain amount of risk in each transaction that takes place. To that end, risk management mechanisms protect the Exchange via the Clearing House. The Clearing House establishes performance bonds (margins) for all Exchange products and establishes minimum performance bond requirements for customers of Exchange products. Performance bonds, also referred to as margins, are the funds that must be deposited by a customer with his or her broker, by a broker with a clearing member, or by a clearing member with the Clearing House, for the purpose of insuring the broker or Clearing House against loss due to breach of contract on open futures or options contracts. Performance bond is not a part payment on a purchase. Rather, performance bond helps to ensure the financial integrity of brokers, clearing members, and the Exchange. The Performance Bond to Clearing House refers to the minimum dollar deposit which is required by the Clearing House from clearing members in accordance with their positions. The initial margin is the total amount of margin per contract required by the broker when a futures position is opened. Maintenance, or maintenance margin, refers to a minimum amount, usually smaller than the initial performance bond, which must remain on deposit in the customer's account for any position at all times. A drop in funds below the maintenance margin level requires a deposit back to the initial margin level, i.e., a performance bond call. If a customer's equity in any futures position drops to or under the maintenance level because of adverse price action, the broker must issue a performance bond/margin call to restore the customer's equity. A performance bond call, also referred to as a margin call, is a demand for additional funds to bring the customer's account back up to the initial performance bond level whenever adverse price movements cause the account to go below the maintenance margin level. Within any given Exchange trading day, a futures contract position that is newly entered and cleared, and then held through the end of the trading day, is marked-to-market by the Exchange, i.e. the current market value, as opposed to the book value, is determined, from the trade price at which the contract position was entered to the trading day's end-of-day settlement price for the contract. Similarly, a futures contract position that is extant at the beginning of a given Exchange trading day, and that is then held through the end of the trading day, is marked-to-market by the Exchange from the previous day's end-of-day settlement price to the current day's end-of-day settlement price for the contract. In both cases, the net of these amounts is banked in cash. That is, if the mark-to-market records an increase in the price of the contract, the Clearing House credits to those clearing members holding open long positions, and debits from those clearing members holding open short positions, the pecuniary value of the change in contract price. If the mark-to-market records a decrease in the price of the contract, the Clearing House debits those clearing members holding open long positions, and credits to those clearing members holding open short positions, the pecuniary value of the change in contract price. Such credits to, or debits from, clearing member accounts at the Clearing House are typically referred to as "variation margin."

Multiple futures contracts for a given underlier may be issued, or otherwise made available for sale/trading, having various future expiration dates, such as monthly or quarterly expiration dates. For example, various futures contracts for oil, gas, treasury securities, etc. may be issued, each having a different expiration. For example, for given underlier, contracts expiring each month of a future calendar year may be available for trading today. These contracts may be made available for trading close to or well in advance of their particular expiration date. For example, a contract having a January 2019 expiration date may be made available for trading in January of 2017. The time between issuance and expiration may be months or even years. At the time a trader takes a position in a particular contract for given underlier, e.g. buys a futures contract to buy or sell the underlier in the future, the nearest expiring available futures contract for that particular underlier is referred to as the "front month" contract. All later expiring contracts for that underlier are referred to as "back month" contracts.

Particularly, with respect to interest rate futures contracts, such as STIR contracts, different traders may wish to trade contracts for many different time periods, e.g. to gain or hedge exposure to future interest rate changes, and for different durations over which the subject interest rate is calculated, e.g. monthly quarterly etc. Depending on the needs of the of the trader, e.g. their trading strategy, a given trader may desire to trade front month, back month or a combination of those contracts, and different durations, e.g. monthly quarterly, etc. e.g. for the purpose of hedging or mitigating risk, etc.

Accordingly, the Exchange may offer many different contract variations in order to meet these trader needs. Of course, it may not be feasible to offer every possible expiry/duration permutation of every contract. This limitation, coupled with a trader's typical desire to minimize the number of transactions and the number of positions, results in Exchanges offering select subset of contracts for trading at any given point in time. Typically, shorter duration contracts are offered with expirations occurring in the near future while quarterly duration contracts are offered with expirations occurring further out. This reflects the decreasing need for precision the further into the future one looks. For example, an exchange may offer monthly duration interest rate contracts with expirations in the following 6-12 months while quarterly duration contracts may be offered with expirations 12-36 months out.

For example, the 30-Day Fed Funds futures and options contracts are important risk management tools for anyone who wants to hedge against or speculate on changes in short-term interest rates brought about by changes in Federal Reserve monetary policy. Fed Funds futures provide trading opportunities and hedging resources for the management of risk exposures associated with a variety of money market interest rates. Standard and mid-curve options on Fed Funds futures offer market participants instruments with defined risk parameters that can be used to express a view on the likelihood of Fed policy changes. Together, these products serve a wide spectrum of users and uses.

The Fed Funds futures contract price represents the market opinion of the average daily fed funds effective rate as calculated and reported by the Federal Reserve Bank of New York for a given calendar month. It is designed to capture the market's need for an instrument that reflects Federal Reserve monetary policy. Because the Fed Funds futures contract is based on the daily fed funds effective rate for a given month, it tends to be highly correlated with other short-term interest rates and is useful for managing the risk associated with changing credit costs for virtually any short-term cash instrument. Fed Funds futures can be used either speculatively to anticipate changes in monetary policy or more conservatively to hedge inventory financing risk across many different markets.

Another interest rate futures contract which may be offered is one based on the above described SOFR, and which may be offered and administered similar to the Fed Funds contracts, e.g. expiring 4 to 7 months out. Furthermore, strips of SOFR contracts, i.e. consecutive SOFR contracts transacted together, e.g. 3 month or quarterly, may be offered. For example, 3 month International Monetary Market ("IMM") compounded contracts may be offered which settle at the end of the quarter, with 16 quarterly contracts offered covering 4 years.

For example, as shown in FIG. 8, One and Three Month SOFR Futures may be defined as follows:

Three-Month SOFR futures

Price is IMM Index=100 minus Rate.

"Rate" is business-day-compounded SOFR interest during the contract Reference Quarter.

Contract Reference Quarter starts on IMM Wednesday of third month before contract delivery month, and ends immediately before IMM Wednesday of contract delivery month.

"Contract Month" is the month in which Reference Quarter begins. Example: For a "March" contract, Reference Quarter starts on IMM Wednesday of March and ends with contract final settlement on IMM Wednesday of June, the contract delivery month.

Each basis point of contract interest is worth $25. Contract size=$2,500×IMM Index.

Initial contract listings will comprise the 20 March Quarterly months starting with June 2018 (i.e., the contract scheduled for final settlement on Wednesday, 19 Sep. 2018)

Intermarket spreads versus the nearby 20 Three-Month Eurodollar (GE) futures—quarterly, White year through Gold year—should furnish a clear view of market assessment of the term structure of basis spreads between 3-month SOFR OIS exposures and corresponding 3-month Eurodollar exposures.

One-Month SOFR futures

Price is IMM Index=100 minus Rate.

"Rate" is arithmetic average of daily SOFR values during contract delivery month.

Each basis point of contract interest is worth $41.67. Contract size=$4,167×IMM Index.

Initial contract listings will comprise the nearest 7 calendar months, starting with May 2018.

Intermarket spreads versus the nearest 7 monthly CBOT 30-Day Federal Funds futures should provide timely indication of market expectations across the nearby term structure of the fed funds-SOFR basis spread.

Complementarity between Three-Month SOFR futures and One-Month SOFR futures: For any Three-Month SOFR futures contract prior to the start of its Reference Quarter, the contract rate—the "Rate" portion of the "100 minus Rate" contract price—gauges market expectation of business-day compounded SOFR during the Reference Quarter, expressed as an interest rate per annum. After the nearby contract enters its Reference Quarter, the contract rate becomes a mix of (i) known SOFR values, ie, published values for all days from start of the Reference Quarter to the present, and (ii) market expectations of SOFR values for all remaining days in the Reference Quarter that lie ahead. As the expiring contract progresses through its Reference Quarter, the forward-looking expectational component of its price plays a steadily diminishing role in fair valuation of the contract. In general, progressively decreasing uncertainty about the contract's final settlement price means steadily less contract price volatility. Seen in this light, the One-Month SOFR futures strip will make a useful complement to Three-Month SOFR futures for market participants who seek finer granularity in framing market expectations of future SOFR values, or who seek finer resolution of SOFR volatility, over the nearby 1-month to 4-month interval.

Exchange Computing System

For example, one exemplary environment where the disclosed embodiments may be desirable is in financial markets, and in particular, electronic financial exchanges, such as a futures exchange, such as the Chicago Mercantile Exchange Inc. (CME).

As described above, financial instrument trading system, such as a futures exchange, such as the Chicago Mercantile Exchange Inc. (CME), provides a contract market where financial instruments, e.g., futures and options on futures, are traded using electronic systems. "Futures" is a term used to designate all contracts for the purchase or sale of financial instruments or physical commodities for future delivery or cash settlement on a commodity futures exchange. A futures contract is a legally binding agreement to buy or sell a commodity at a specified price at a predetermined future time. An option contract is the right, but not the obligation, to sell or buy the underlying instrument (in this case, a futures contract) at a specified price on or before a certain expiration date. An option contract offers an opportunity to take advantage of futures price moves without actually having a futures position. The commodity to be delivered in fulfillment of the contract, or alternatively the commodity for which the cash market price shall determine the final settlement price of the futures contract, is known as the contract's underlying reference or "underlier." The underlying or underlier for an options contract is the corresponding futures contract that is purchased or sold upon the exercise of the option.

The terms and conditions of each futures contract are standardized as to the specification of the contract's underlying reference commodity, the quality of such commodity, quantity, delivery date, and means of contract settlement. Cash settlement is a method of settling a futures contract whereby the parties effect final settlement when the contract expires by paying/receiving the loss/gain related to the contract in cash, rather than by effecting physical sale and purchase of the underlying reference commodity at a price determined by the futures contract, price. Options and futures may be based on more generalized market indicators, such as stock indices, interest rates, futures contracts and other derivatives.

Electronic Trading

Electronic trading of financial instruments, such as futures contracts, is conducted by market participants sending orders, such as to buy or sell one or more futures contracts, in electronic form to the exchange, i.e. to the electronic data processing system which implements the electronic trading system. These electronically submitted orders to buy and sell are then matched, if possible, by the exchange, i.e., by the exchange's matching engine, to execute a trade. Outstanding (unmatched, wholly unsatisfied/unfilled or partially satisfied/filled) orders are maintained in one or more data structures or databases referred to as "order books," such orders being referred to as "resting," and made visible, i.e., their availability for trading is advertised, to the market participants through electronic notifications/broadcasts, referred to as market data feeds. An order book is typically maintained for each product, e.g., instrument, traded on the electronic trading system and generally defines or otherwise represents the state of the market for that product, i.e., the current prices at which the market participants are willing buy or sell that product. As such, as used herein, an order book for a product may also be referred to as a market for that product.

Upon receipt of an incoming order to trade in a particular financial instrument, whether for a single-component financial instrument, e.g., a single futures contract, or for a multiple-component financial instrument, e.g., a combination contract such as a spread contract, a match engine, as described herein, will attempt to identify a previously received but unsatisfied order counter thereto, i.e., for the opposite transaction (buy or sell) in the same financial instrument at the same or better price (but not necessarily for the same quantity unless, for example, either order specifies a condition that it must be entirely filled or not at all).

Previously received but unsatisfied orders, i.e., orders which either did not match with a counter order when they were received or their quantity was only partially satisfied, referred to as a partial fill, are maintained by the electronic trading system in an order book database/data structure to await the subsequent arrival of matching orders or the occurrence of other conditions which may cause the order to be modified or otherwise removed from the order book.

If the match engine identifies one or more suitable previously received but unsatisfied counter orders, they, and the incoming order, are matched to execute a trade there between to at least partially satisfy the quantities of one or both the incoming order or the identified orders. If there remains any residual unsatisfied quantity of the identified one or more orders, those orders are left on the order book with their remaining quantity to await a subsequent suitable counter order, i.e., to rest. If the match engine does not identify a suitable previously received but unsatisfied counter order, or the one or more identified suitable previously received but unsatisfied counter orders are for a lesser quantity than the incoming order, the incoming order is placed on the order book, referred to as "resting", with original or remaining unsatisfied quantity, to await a subsequently received suitable order counter thereto. The match engine then generates match event data reflecting the result of this matching process. Other components of the electronic trading system, as will be described, then generate the respective order acknowledgment and market data messages and transmit those messages to the market participants.

Matching, which is a function typically performed by the exchange, is a process, for a given order which specifies a desire to buy or sell a quantity of a particular instrument at a particular price, of seeking/identifying one or more wholly or partially, with respect to quantity, satisfying counter orders thereto, e.g., a sell counter to an order to buy, or vice versa, for the same instrument at the same, or sometimes better, price (but not necessarily the same quantity), which are then paired for execution to complete a trade between the respective market participants (via the exchange) and at least partially satisfy the desired quantity of one or both of the order and/or the counter order, with any residual unsatisfied quantity left to await another suitable counter order, referred to as "resting." A match event may occur, for example, when an aggressing order matches with a resting order. In one embodiment, two orders match because one order includes instructions for or specifies buying a quantity of a particular instrument at a particular price, and the other order includes instructions for or specifies selling a (different or same) quantity of the instrument at a same or better price. It should be appreciated that performing an instruction associated with a message may include attempting to perform the instruction. Whether or not an exchange computing system is able to successfully perform an instruction may depend on the state of the electronic marketplace.

While the disclosed embodiments will be described with respect to a product by product or market by market implementation, e.g. implemented for each market/order book, it will be appreciated that the disclosed embodiments may be implemented so as to apply across markets for multiple products traded on one or more electronic trading systems, such as by monitoring an aggregate, correlated or other derivation of the relevant indicative parameters as described herein.

While the disclosed embodiments may be discussed in relation to futures and/or options on futures trading, it should be appreciated that the disclosed embodiments may be applicable to any equity, fixed income security, currency, commodity, options or futures trading system or market now available or later developed. It may be appreciated that a trading environment, such as a futures exchange as described herein, implements one or more economic markets where rights and obligations may be traded. As such, a trading environment may be characterized by a need to maintain market integrity, transparency, predictability, fair/equitable access and participant expectations with respect thereto. In addition, it may be appreciated that electronic trading systems further impose additional expectations and demands by market participants as to transaction processing speed, latency, capacity and response time, while creating additional complexities relating thereto. Accordingly, as will be described, the disclosed embodiments may further include functionality to ensure that the expectations of market participants are met, e.g., that transactional integrity and predictable system responses are maintained.

Financial instrument trading systems allow traders to submit orders and receive confirmations, market data, and other information electronically via electronic messages exchanged using a network. Electronic trading systems ideally attempt to offer a more efficient, fair and balanced market where market prices reflect a true consensus of the value of traded products among the market participants, where the intentional or unintentional influence of any one market participant is minimized if not eliminated, and where unfair or inequitable advantages with respect to information access are minimized if not eliminated.

Electronic marketplaces attempt to achieve these goals by using electronic messages to communicate actions and related data of the electronic marketplace between market participants, clearing firms, clearing houses, and other parties. The messages can be received using an electronic trading system, wherein an action or transaction associated with the messages may be executed. For example, the message may contain information relating to an order to buy or sell a product in a particular electronic marketplace, and the action associated with the message may indicate that the order is to be placed in the electronic marketplace such that other orders which were previously placed may potentially be matched to the order of the received message. Thus the electronic marketplace may conduct market activities through electronic systems.

An exchange may provide for a centralized "clearing house" through which trades made must be confirmed, matched, and settled each day until offset or delivered. The clearing house may be an adjunct to an exchange, and may be an operating division of an exchange, which is responsible for settling trading accounts, clearing trades, collecting and maintaining performance bond funds, regulating delivery, and reporting trading data. One of the roles of the clearing house is to mitigate credit risk. Clearing is the procedure through which the clearing house becomes buyer to each seller of a futures contract, and seller to each buyer, also referred to as a novation, and assumes responsibility for protecting buyers and sellers from financial loss due to breach of contract, by assuring performance on each contract. A clearing member is a firm qualified to clear trades through the clearing house.

An exchange computing system may operate under a central counterparty model, where the exchange acts as an intermediary between market participants for the transaction of financial instruments. In particular, the exchange computing system novates itself into the transactions between the market participants, i.e., splits a given transaction between the parties into two separate transactions where the exchange computing system substitutes itself as the counterparty to each of the parties for that part of the transaction, sometimes referred to as a novation. In this way, the exchange computing system acts as a guarantor and central counterparty and there is no need for the market participants to disclose their identities to each other, or subject themselves to credit or other investigations by a potential counterparty. For example, the exchange computing system insulates one market participant from the default by another market participant. Market participants need only meet the requirements of the exchange computing system. Anonymity among the market participants encourages a more liquid market environment as there are lower barriers to participation. The exchange computing system can accordingly offer benefits such as centralized and anonymous matching and clearing.

Electronic Data Transaction Request Messages

As used herein, a financial message, or an electronic message, refers both to messages communicated by market participants to an electronic trading or market system and vice versa. The messages may be communicated using packeting or other techniques operable to communicate information between systems and system components. Some messages may be associated with actions to be taken in the electronic trading or market system. In particular, in one embodiment, upon receipt of a request, a token is allocated and included in a TCP shallow acknowledgment transmission sent back to the participant acknowledging receipt of the request. It should be appreciated that while this shallow acknowledgment is, in some sense, a response to the request, it does not confirm the processing of an order included in the request. The participant, i.e., their device, then sends back a TCP acknowledgment which acknowledges receipt of the shallow acknowledgment and token.

Financial messages communicated to the electronic trading system, also referred to as "inbound" messages, may include associated actions that characterize the messages, such as trader orders, order modifications, order cancellations and the like, as well as other message types. Inbound messages may be sent from client devices associated with market participants, or their representatives, e.g., trade order messages, etc., to an electronic trading or market system. For example, a market participant may submit an electronic message to the electronic trading system that includes an associated specific action to be undertaken by the electronic trading system, such as entering a new trade order into the market or modifying an existing order in the market. In one embodiment, if a participant wishes to modify a previously sent request, e.g., a prior order which has not yet been processed or traded, they may send a request message comprising a request to modify the prior request. In one exemplary embodiment, the incoming request itself, e.g., the inbound order entry, may be referred to as an iLink message. iLink is a bidirectional communications/message protocol/message format implemented by the Chicago Mercantile Exchange Inc.

Financial messages communicated from the electronic trading system, referred to as "outbound" messages, may include messages responsive to inbound messages, such as confirmation messages, or other messages such as market update messages, quote messages, and the like. Outbound messages may be disseminated via data feeds.

Financial messages may further be categorized as having or reflecting an impact on a market or electronic marketplace, also referred to as an "order book" or "book," for a traded product, such as a prevailing price therefore, number of resting orders at various price levels and quantities thereof, etc., or not having or reflecting an impact on a market or a subset or portion thereof. In one embodiment, an electronic order book may be understood to be an electronic collection of the outstanding or resting orders for a financial instrument.

For example, a request to place a trade may result in a response indicative of the trade either being matched with, or being rested on an order book to await, a suitable counter-order. This response may include a message directed solely to the trader who submitted the order to acknowledge receipt of the order and report whether it was matched, and the extent thereto, or rested. The response may further include a message to all market participants reporting a change in the order book due to the order. This response may take the form of a report of the specific change to the order book, e.g., an order for quantity X at price Y was added to the book (referred to, in one embodiment, as a Market By Order message), or may simply report the result, e.g., price level Y now has orders for a total quantity of Z (where Z is the sum of the previous resting quantity plus quantity X of the new order). In some cases, requests may elicit a non-impacting response, such as temporally proximate to the receipt of the request, and then cause a separate market-impact reflecting response at a later time. For example, a stop order, fill or kill order (FOK), also known as an immediate or cancel order, or other conditional request may not have an immediate market impacting effect, if at all, until the requisite conditions are met.

An acknowledgement or confirmation of receipt, e.g., a non-market impacting communication, may be sent to the trader simply confirming that the order was received. Upon the conditions being met and a market impacting result thereof occurring, a market-impacting message may be transmitted as described herein both directly back to the submitting market participant and to all market participants (in a Market By Price "MBP" e.g., Aggregated By Value ("ABV") book, or Market By Order "MBO", e.g., Per Order ("PO") book format). It should be appreciated that additional conditions may be specified, such as a time or price limit, which may cause the order to be dropped or otherwise canceled and that such an event may result in another non-market-impacting communication instead. In some implementations, market impacting communications may be communicated separately from non-market impacting communications, such as via a separate communications channel or feed.

For additional details and descriptions of different market data feeds, see U.S. Patent Application Publication No. 2017/0331774 A1, filed on May 16, 2016, entitled "Systems and Methods for Consolidating Multiple Feed Data", assigned to the assignee of the present application, the entirety of which is incorporated by reference herein and relied upon.

Clearing House

The clearing house of an exchange clears, settles and guarantees matched transactions in contracts occurring through the facilities of the exchange. In addition, the clearing house establishes and monitors financial requirements for clearing members and conveys certain clearing privileges in conjunction with the relevant exchange markets.

The clearing house establishes clearing level performance bonds (margins) for all products of the exchange and establishes minimum performance bond requirements for customers of such products. A performance bond, also referred to as a margin requirement, corresponds with the funds that must be deposited by a customer with his or her broker, by a broker with a clearing member or by a clearing member with the clearing house, for the purpose of insuring the broker or clearing house against loss on open futures or options contracts. This is not a part payment on a purchase. The performance bond helps to ensure the financial integrity of brokers, clearing members and the exchange as a whole. The performance bond refers to the minimum dollar deposit required by the clearing house from clearing members in accordance with their positions. Maintenance, or maintenance margin, refers to a sum, usually smaller than the initial performance bond, which must remain on deposit in the customer's account for any position at all times. The initial margin is the total amount of margin per contract required by the broker when a futures position is opened. A drop in funds below this level requires a deposit back to the initial margin levels, i.e., a performance bond call. If a customer's equity in any futures position drops to or under the maintenance level because of adverse price action, the broker must issue a performance bond/margin call to restore the customer's equity. A performance bond call, also referred to as a margin call, is a demand for additional funds to bring the customer's account back up to the initial performance bond level whenever adverse price movements cause the account to go below the maintenance.

The exchange derives its financial stability in large part by removing debt obligations among market participants as they occur. This is accomplished by determining a settlement price at the close of the market each day for each contract and marking all open positions to that price, referred to as "mark to market." Every contract is debited or credited based on that trading session's gains or losses. As prices move for or against a position, funds flow into and out of the trading account. In the case of the CME, each business day by 6:40 a.m. Chicago time, based on the mark-to-the-market of all open positions to the previous trading day's settlement price, the clearing house pays to or collects cash from each clearing member. This cash flow, known as settlement variation, is performed by CME's settlement banks based on instructions issued by the clearing house. All payments to and collections from clearing members are made in "same-day" funds. In addition to the 6:40 a.m. settlement, a daily intra-day mark-to-the market of all open positions, including trades executed during the overnight GLOBEX®, the CME's electronic trading systems, trading session and the current day's trades matched before 11:15 a.m., is performed using current prices. The resulting cash payments are made intra-day for same day value. In times of extreme price volatility, the clearing house has the authority to perform additional intra-day mark-to-the-market calculations on open positions and to call for immediate payment of settlement variation. CME's mark-to-the-market settlement system differs from the settlement systems implemented by many other financial markets, including the interbank, Treasury securities, over-the-counter foreign exchange and debt, options, and equities markets, where participants regularly assume credit exposure to each other. In those markets, the failure of one participant can have a ripple effect on the solvency of the other participants. Conversely, CME's mark-to-the-market system does not allow losses to accumulate over time or allow a market participant the opportunity to defer losses associated with market positions.

While the disclosed embodiments may be described in reference to the CME, it should be appreciated that these embodiments are applicable to any exchange. Such other exchanges may include a clearing house that, like the CME clearing house, clears, settles and guarantees all matched transactions in contracts of the exchange occurring through its facilities. In addition, such clearing houses establish and monitor financial requirements for clearing members and convey certain clearing privileges in conjunction with the relevant exchange markets.

The disclosed embodiments are also not limited to uses by a clearing house or exchange for purposes of enforcing a performance bond or margin requirement. For example, a market participant may use the disclosed embodiments in a simulation or other analysis of a portfolio. In such cases, the settlement price may be useful as an indication of a value at risk and/or cash flow obligation rather than a performance bond. The disclosed embodiments may also be used by market participants or other entities to forecast or predict the effects of a prospective position on the margin requirement of the market participant.

Trading Environment

The embodiments may be described in terms of a distributed computing system. The particular examples identify a specific set of components useful in a futures and options exchange. However, many of the components and inventive features are readily adapted to other electronic trading environments. The specific examples described herein may teach specific protocols and/or interfaces, although it should be understood that the principals involved may be extended to, or applied in, other protocols and interfaces.

It should be appreciated that the plurality of entities utilizing or involved with the disclosed embodiments, e.g., the market participants, may be referred to by other nomenclature reflecting the role that the particular entity is performing with respect to the disclosed embodiments and that a given entity may perform more than one role depending upon the implementation and the nature of the particular transaction being undertaken, as well as the entity's contractual and/or legal relationship with another market participant and/or the exchange.

An exemplary trading network environment for implementing trading systems and methods is shown in FIG. 1. An exchange computer system 100 receives messages that include orders and transmits market data related to orders and trades to users, such as via wide area network 162 and/or local area network 160 and computer devices 150, 152, 154, 156 and 158, as described herein, coupled with the exchange computer system 100.

Herein, the phrase "coupled with" is defined to mean directly connected to or indirectly connected through one or more intermediate components. Such intermediate components may include both hardware and software based components. Further, to clarify the use in the pending claims and to hereby provide notice to the public, the phrases "at least one of <A>, <B>, . . . and <N>" or "at least one of <A>, <B>, <N>, or combinations thereof" are defined by the Applicant in the broadest sense, superseding any other implied definitions herebefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

Figure 2:
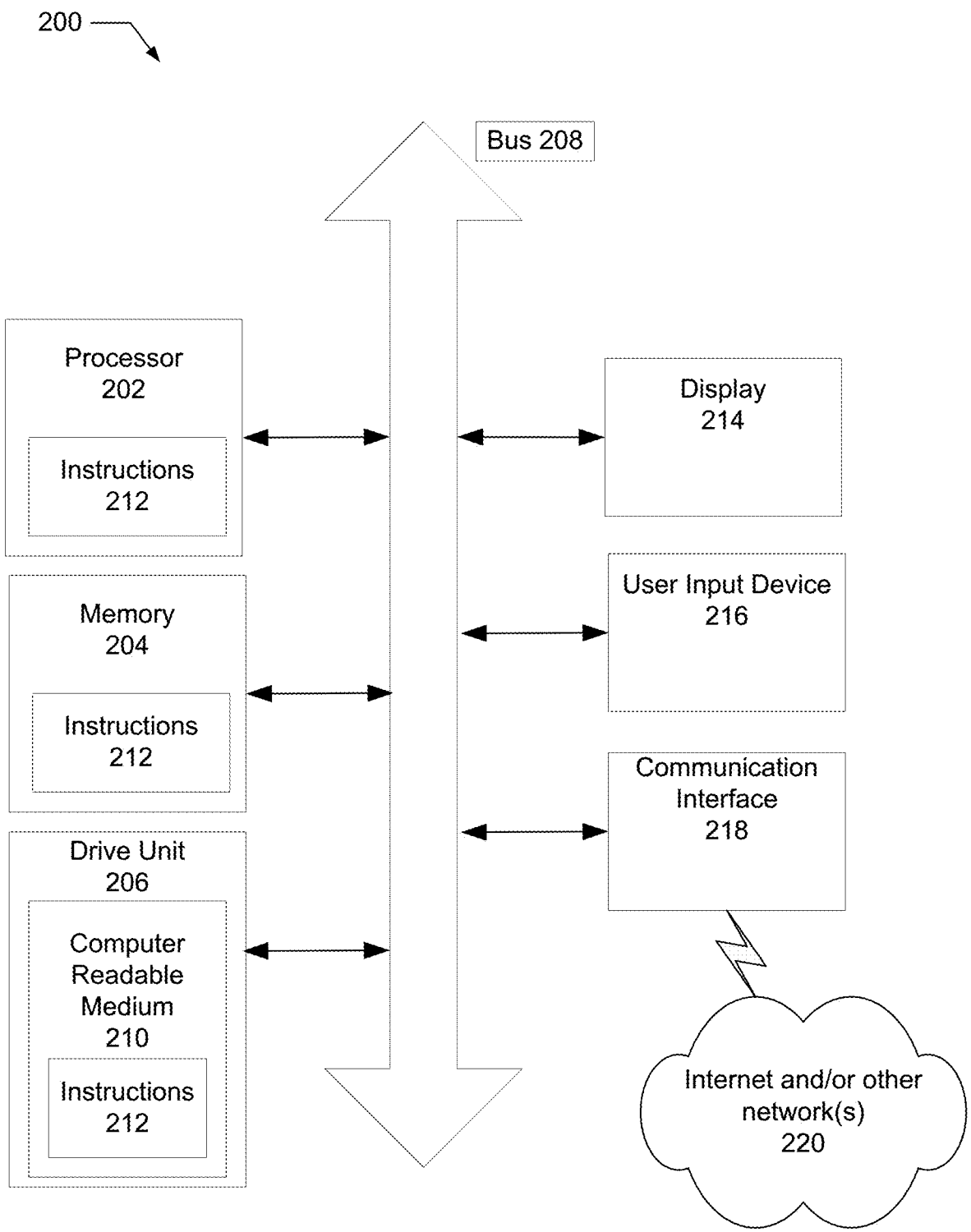
FIG. 2 depicts a general computer system, according to some embodiments.

The exchange computer system 100 may be implemented with one or more mainframe, desktop or other computers, such as the example computer 200 described herein with respect to FIG. 2.

A user database 102 may be provided which includes information identifying traders and other users of exchange computer system 100, such as account numbers or identifiers, user names and passwords. An account data module 104 may be provided which may process account information that may be used during trades.

A match engine module 106 may be included to match bid and offer prices and may be implemented with software that executes one or more algorithms for matching bids and offers. A trade database 108 may be included to store information identifying trades and descriptions of trades. In particular, a trade database may store information identifying the time that a trade took place and the contract price. An order book module 110 may be included to compute or otherwise determine current bid and offer prices, e.g., in a continuous auction market, or also operate as an order accumulation buffer for a batch auction market.

A market data module 112 may be included to collect market data and prepare the data for transmission to users.

A risk management module 114 may be included to compute and determine a user's risk utilization in relation to the user's defined risk thresholds. The risk management module 114 may also be configured to determine risk assessments or exposure levels in connection with positions held by a market participant. The risk management module 114 may be configured to administer, manage or maintain one or more margining mechanisms implemented by the exchange computer system 100. Such administration, management or maintenance may include managing a number of database records reflective of margin accounts of the market participants. In some embodiments, the risk management module 114 implements one or more aspects of the disclosed embodiments, including, for instance, principal component analysis (PCA) based margining, in connection with interest rate swap (IRS) portfolios, as described herein.

A message management module 116 may be included to, among other things, receive, and extract orders from, electronic data transaction request messages. The message management module 116 may define a point of ingress into the exchange computer system 100 where messages are ordered and considered to be received by the system. This may be considered a point of determinism in the exchange computer system 100 that defines the earliest point where the system can ascribe an order of receipt to arriving messages. The point of determinism may or may not be at or near the demarcation point between the exchange computer system 100 and a public/internet network infrastructure. The message management module 116 processes messages by interpreting the contents of a message based on the message transmit protocol, such as the transmission control protocol ("TCP"), to provide the content of the message for further processing by the exchange computer system.

The message management module 116 may also be configured to detect characteristics of an order for a transaction to be undertaken in an electronic marketplace. For example, the message management module 116 may identify and extract order content such as a price, product, volume, and associated market participant for an order. The message management module 116 may also identify and extract data indicating an action to be executed by the exchange computer system 100 with respect to the extracted order. For example, the message management module 116 may determine the transaction type of the transaction requested in a given message. A message may include an instruction to perform a type of transaction. The transaction type may be, in one embodiment, a request/offer/order to either buy or sell a specified quantity or units of a financial instrument at a specified price or value. The message management module 116 may also identify and extract other order information and other actions associated with the extracted order. All extracted order characteristics, other information, and associated actions extracted from a message for an order may be collectively considered an order as described and referenced herein.

Order or message characteristics may include, for example, the state of the system after a message is received, arrival time (e.g., the time a message arrives at the MSG or Market Segment Gateway), message type (e.g., new, modify, cancel), and the number of matches generated by a message. Order or message characteristics may also include market participant side (e.g., buyer or seller) or time in force (e.g., a good until end of day order that is good for the full trading day, a good until canceled ordered that rests on the order book until matched, or a fill or kill order that is canceled if not filled immediately, or a fill and kill order (FOK) that is filled to the maximum amount possible, and any remaining or unfilled/unsatisfied quantity is not stored on the books or allowed to rest).

An order processing module 118 may be included to decompose delta-based, spread instrument, bulk and other types of composite orders for processing by the order book module 110 and/or the match engine module 106. The order processing module 118 may also be used to implement one or more procedures related to clearing an order. The order may be communicated from the message management module 118 to the order processing module 118. The order processing module 118 may be configured to interpret the communicated order, and manage the order characteristics, other information, and associated actions as they are processed through an order book module 110 and eventually transacted on an electronic market. For example, the order processing module 118 may store the order characteristics and other content and execute the associated actions. In an embodiment, the order processing module may execute an associated action of placing the order into an order book for an electronic trading system managed by the order book module 110. In an embodiment, placing an order into an order book and/or into an electronic trading system may be considered a primary action for an order. The order processing module 118 may be configured in various arrangements, and may be configured as part of the order book module 110, part of the message management module 118, or as an independent functioning module.

As an intermediary to electronic trading transactions, the exchange bears a certain amount of risk in each transaction that takes place. To that end, the clearing house implements risk management mechanisms to protect the exchange. One or more of the modules of the exchange computer system 100 may be configured to determine settlement prices for constituent contracts, such as deferred month contracts, of spread instruments, such as for example, settlement module 120. A settlement module 120 (or settlement processor or other payment processor) may be included to provide one or more functions related to settling or otherwise administering transactions cleared by the exchange. Settlement module 120 of the exchange computer system 100 may implement one or more settlement price determination techniques. Settlement-related functions need not be limited to actions or events occurring at the end of a contract term. For instance, in some embodiments, settlement-related functions may include or involve daily or other mark to market settlements for margining purposes. In some cases, the settlement module 120 may be configured to communicate with the trade database 108 (or the memory(ies) on which the trade database 108 is stored) and/or to determine a payment amount based on a spot price, the price of the futures contract or other financial instrument, or other price data, at various times. The determination may be made at one or more points in time during the term of the financial instrument in connection with a margining mechanism. For example, the settlement module 120 may be used to determine a mark to market amount on a daily basis during the term of the financial instrument. Such determinations may also be made on a settlement date for the financial instrument for the purposes of final settlement.

In some embodiments, the settlement module 120 may be integrated to any desired extent with one or more of the other modules or processors of the exchange computer system 100. For example, the settlement module 120 and the risk management module 114 may be integrated to any desired extent. In some cases, one or more margining procedures or other aspects of the margining mechanism(s) may be implemented by the settlement module 120.

A forward rate module 122 may be coupled with the match engine module 106 and/or order book module 110, or any other module necessary to provide the requisite data as described below. As will be discussed in more detail below, the forward rate module 122 monitors the trading of particular futures contracts and, based thereon, generates forward interest rates for select time periods. These forward interest rates may be output one or more market participants and/or communicated to other modules of the exchange computer system 100 to be utilized in the calculation of other data, such as values of positions in interest rate instrument products held by market participants, e.g. stored in the user database, such as for computation of risk of loss by the risk management module 114.

One or more of the above-described modules of the exchange computer system 100 may be used to gather or obtain data to support the settlement price determination, as well as a subsequent margin requirement determination. For example, the order book module 110 and/or the market data module 112 may be used to receive, access, or otherwise obtain market data, such as bid-offer values of orders currently on the order books. The trade database 108 may be used to receive, access, or otherwise obtain trade data indicative of the prices and volumes of trades that were recently executed in a number of markets. In some cases, transaction data (and/or bid/ask data) may be gathered or obtained from open outcry pits and/or other sources and incorporated into the trade and market data from the electronic trading system(s).

It should be appreciated that concurrent processing limits may be defined by or imposed separately or in combination on one or more of the trading system components, including the user database 102, the account data module 104, the match engine module 106, the trade database 108, the order book module 110, the market data module 112, the risk management module 114, the message management module 116, the order processing module 118, the settlement module 120, the forward rate module 122, or other component of the exchange computer system 100.

The disclosed mechanisms may be implemented at any logical and/or physical point(s), or combinations thereof, at which the relevant information/data (e.g., message traffic and responses thereto) may be monitored or flows or is otherwise accessible or measurable, including one or more gateway devices, modems, the computers or terminals of one or more market participants, e.g., client computers, etc.

One skilled in the art will appreciate that one or more modules described herein may be implemented using, among other things, a tangible computer-readable medium comprising computer-executable instructions (e.g., executable software code). Alternatively, modules may be implemented as software code, firmware code, specifically configured hardware or processors, and/or a combination of the aforementioned. For example, the modules may be embodied as part of an exchange 100 for financial instruments. It should be appreciated the disclosed embodiments may be implemented as a different or separate module of the exchange computer system 100, or a separate computer system coupled with the exchange computer system 100 so as to have access to margin account record, pricing, and/or other data. As described herein, the disclosed embodiments may be implemented as a centrally accessible system or as a distributed system, e.g., where some of the disclosed functions are performed by the computer systems of the market participants.

The trading network environment shown in FIG. 1 includes exemplary computer devices 150, 152, 154, 156 and 158 which depict different exemplary methods or media by which a computer device may be coupled with the exchange computer system 100 or by which a user may communicate, e.g., send and receive, trade or other information therewith. It should be appreciated that the types of computer devices deployed by traders and the methods and media by which they communicate with the exchange computer system 100 is implementation dependent and may vary and that not all of the depicted computer devices and/or means/media of communication may be used and that other computer devices and/or means/media of communications, now available or later developed may be used. Each computer device, which may comprise a computer 200 described in more detail with respect to FIG. 2, may include a central processor, specifically configured or otherwise, that controls the overall operation of the computer and a system bus that connects the central processor to one or more conventional components, such as a network card or modem. Each computer device may also include a variety of interface units and drives for reading and writing data or files and communicating with other computer devices and with the exchange computer system 100. Depending on the type of computer device, a user can interact with the computer with a keyboard, pointing device, microphone, pen device or other input device now available or later developed.

An exemplary computer device 150 is shown directly connected to exchange computer system 100, such as via a T1 line, a common local area network (LAN) or other wired and/or wireless medium for connecting computer devices, such as the network 220 shown in FIG. 2 and described with respect thereto. The exemplary computer device 150 is further shown connected to a radio 168. The user of radio 168, which may include a cellular telephone, smart phone, or other wireless proprietary and/or non-proprietary device, may be a trader or exchange employee. The radio user may transmit orders or other information to the exemplary computer device 150 or a user thereof. The user of the exemplary computer device 150, or the exemplary computer device 150 alone and/or autonomously, may then transmit the trade or other information to the exchange computer system 100.

Exemplary computer devices 152 and 154 are coupled with a local area network ("LAN") 160 which may be configured in one or more of the well-known LAN topologies, e.g., star, daisy chain, etc., and may use a variety of different protocols, such as Ethernet, TCP/IP, etc. The exemplary computer devices 152 and 154 may communicate with each other and with other computer and other devices which are coupled with the LAN 160. Computer and other devices may be coupled with the LAN 160 via twisted pair wires, coaxial cable, fiber optics or other wired or wireless media. As shown in FIG. 1, an exemplary wireless personal digital assistant device ("PDA") 158, such as a mobile telephone, tablet based compute device, or other wireless device, may communicate with the LAN 160 and/or the Internet 162 via radio waves, such as via WiFi, Bluetooth and/or a cellular telephone based data communications protocol. PDA 158 may also communicate with exchange computer system 100 via a conventional wireless hub 164.

FIG. 1 also shows the LAN 160 coupled with a wide area network ("WAN") 162 which may be comprised of one or more public or private wired or wireless networks. In one embodiment, the WAN 162 includes the Internet 162. The LAN 160 may include a router to connect LAN 160 to the Internet 162. Exemplary computer device 156 is shown coupled directly to the Internet 162, such as via a modem, DSL line, satellite dish or any other device for connecting a computer device to the Internet 162 via a service provider therefore as is known. LAN 160 and/or WAN 162 may be the same as the network 220 shown in FIG. 2 and described with respect thereto.

Users of the exchange computer system 100 may include one or more market makers 166 which may maintain a market by providing constant bid and offer prices for a derivative or security to the exchange computer system 100, such as via one of the exemplary computer devices depicted. The exchange computer system 100 may also exchange information with other match or trade engines, such as trade engine 170. One skilled in the art will appreciate that numerous additional computers and systems may be coupled to exchange computer system 100. Such computers and systems may include clearing, regulatory and fee systems.

The operations of computer devices and systems shown in FIG. 1 may be controlled by computer-executable instructions stored on a non-transitory computer-readable medium. For example, the exemplary computer device 152 may store computer-executable instructions for receiving order information from a user, transmitting that order information to exchange computer system 100 in electronic messages, extracting the order information from the electronic messages, executing actions relating to the messages, and/or calculating values from characteristics of the extracted order to facilitate matching orders and executing trades. In another example, the exemplary computer device 154 may include computer-executable instructions for receiving market data from exchange computer system 100 and displaying that information to a user.

Numerous additional servers, computers, handheld devices, personal digital assistants, telephones and other devices may also be connected to exchange computer system 100. Moreover, one skilled in the art will appreciate that the topology shown in FIG. 1 is merely an example and that the components shown in FIG. 1 may include other components not shown and be connected by numerous alternative topologies.

Referring now to FIG. 2, an illustrative embodiment of a general computer system 200 is shown. The computer system 200 can include a set of instructions that can be executed to cause the computer system 200 to perform any one or more of the methods or computer based functions disclosed herein. The computer system 200 may operate as a standalone device or may be connected, e.g., using a network, to other computer systems or peripheral devices. Any of the components discussed herein, such as processor 202, may be a computer system 200 or a component in the computer system 200. The computer system 200 may be specifically configured to implement a match engine, margin processing, payment or clearing function on behalf of an exchange, such as the Chicago Mercantile Exchange, of which the disclosed embodiments are a component thereof.

In a networked deployment, the computer system 200 may operate in the capacity of a server or as a client user computer in a client-server user network environment, or as a peer computer system in a peer-to-peer (or distributed) network environment. The computer system 200 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 200 can be implemented using electronic devices that provide voice, video or data communication. Further, while a single computer system 200 is illustrated, the term "system" shall also be taken to include any collection of systems or sub-systems that individually or jointly execute a set, or multiple sets, of instructions to perform one or more computer functions.

As illustrated in FIG. 2, the computer system 200 may include a processor 202, e.g., a central processing unit (CPU), a graphics processing unit (GPU), or both. The processor 202 may be a component in a variety of systems. For example, the processor 202 may be part of a standard personal computer or a workstation. The processor 202 may be one or more general processors, digital signal processors, specifically configured processors, application specific integrated circuits, field programmable gate arrays, servers, networks, digital circuits, analog circuits, combinations thereof, or other now known or later developed devices for analyzing and processing data. The processor 202 may implement a software program, such as code generated manually (i.e., programmed).

The computer system 200 may include a memory 204 that can communicate via a bus 208. The memory 204 may be a main memory, a static memory, or a dynamic memory. The memory 204 may include, but is not limited to, computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one embodiment, the memory 204 includes a cache or random access memory for the processor 202. In alternative embodiments, the memory 204 is separate from the processor 202, such as a cache memory of a processor, the system memory, or other memory. The memory 204 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 204 is operable to store instructions executable by the processor 202. The functions, acts or tasks illustrated in the figures or described herein may be performed by the programmed processor 202 executing the instructions 212 stored in the memory 204. The functions, acts or tasks are independent of the particular type of instructions set, storage media, processor or processing strategy and may be performed by software, hardware, integrated circuits, firm-ware, microcode and the like, operating alone or in combination. Likewise, processing strategies may include multiprocessing, multitasking, parallel processing and the like.

As shown, the computer system 200 may further include a display unit 214, such as a liquid crystal display (LCD), an organic light emitting diode (OLED), a flat panel display, a solid state display, a cathode ray tube (CRT), a projector, a printer or other now known or later developed display device for outputting determined information. The display 214 may act as an interface for the user to see the functioning of the processor 202, or specifically as an interface with the software stored in the memory 204 or in the drive unit 206.

Additionally, the computer system 200 may include an input device 216 configured to allow a user to interact with any of the components of system 200. The input device 216 may be a number pad, a keyboard, or a cursor control device, such as a mouse, or a joystick, touch screen display, remote control or any other device operative to interact with the system 200.

In a particular embodiment, as depicted in FIG. 2, the computer system 200 may also include a disk or optical drive unit 206. The disk drive unit 206 may include a computer-readable medium 210 in which one or more sets of instructions 212, e.g., software, can be embedded. Further, the instructions 212 may embody one or more of the methods or logic as described herein. In a particular embodiment, the instructions 212 may reside completely, or at least partially, within the memory 204 and/or within the processor 202 during execution by the computer system 200. The memory 204 and the processor 202 also may include computer-readable media as discussed herein.

The present disclosure contemplates a computer-readable medium that includes instructions 212 or receives and executes instructions 212 responsive to a propagated signal, so that a device connected to a network 220 can communicate voice, video, audio, images or any other data over the network 220. Further, the instructions 212 may be transmitted or received over the network 220 via a communication interface 218. The communication interface 218 may be a part of the processor 202 or may be a separate component. The communication interface 218 may be created in software or may be a physical connection in hardware. The communication interface 218 is configured to connect with a network 220, external media, the display 214, or any other components in system 200, or combinations thereof. The connection with the network 220 may be a physical connection, such as a wired Ethernet connection or may be established wirelessly. Likewise, the additional connections with other components of the system 200 may be physical connections or may be established wirelessly.

The network 220 may include wired networks, wireless networks, or combinations thereof. The wireless network may be a cellular telephone network, an 802.11, 802.16, 802.20, or WiMax network. Further, the network 220 may be a public network, such as the Internet, a private network, such as an intranet, or combinations thereof, and may utilize a variety of networking protocols now available or later developed including, but not limited to, TCP/IP based networking protocols.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein. The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated or otherwise specifically configured hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and anyone or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

As used herein, the terms "microprocessor" or "general-purpose processor" ("GPP") may refer to a hardware device that fetches instructions and data from a memory or storage device and executes those instructions (for example, an Intel Xeon processor or an AMD Opteron processor) to then, for example, process the data in accordance therewith. The term "reconfigurable logic" may refer to any logic technology whose form and function can be significantly altered (i.e., reconfigured) in the field post-manufacture as opposed to a microprocessor, whose function can change post-manufacture, e.g. via computer executable software code, but whose form, e.g. the arrangement/layout and interconnection of logical structures, is fixed at manufacture. The term "software" may refer to data processing functionality that is deployed on a GPP. The term "firmware" may refer to data processing functionality that is deployed on reconfigurable logic. One example of a reconfigurable logic is a field programmable gate array ("FPGA") which is a reconfigurable integrated circuit. An FPGA may contain programmable logic components called "logic blocks", and a hierarchy of reconfigurable interconnects that allow the blocks to be "wired together", somewhat like many (changeable) logic gates that can be inter-wired in (many) different configurations. Logic blocks may be configured to perform complex combinatorial functions, or merely simple logic gates like AND, OR, NOT and XOR. An FPGA may further include memory elements, which may be simple flip-flops or more complete blocks of memory.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well. Feedback provided to the user can be any form of sensory feedback, e.g., visual feedback, auditory feedback, or tactile feedback. Input from the user can be received in any form, including acoustic, speech, or tactile input.

Embodiments of the subject matter described in this specification can be implemented in a computing system that includes a back end component, e.g., a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

It should be appreciated that the disclosed embodiments may be applicable to other types of messages depending upon the implementation. Further, the messages may comprise one or more data packets, datagrams or other collection of data formatted, arranged configured and/or packaged in a particular one or more protocols, e.g., the FIX protocol, TCP/IP, Ethernet, etc., suitable for transmission via a network 214 as was described, such as the message format and/or protocols described in U.S. Pat. No. 7,831,491 and U.S. Patent Publication No. 2005/0096999 A1, both of which are incorporated by reference herein in their entireties and relied upon. Further, the disclosed message management system may be implemented using an open message standard implementation, such as FIX, FIX Binary, FIX/FAST, or by an exchange-provided API.

The embodiments described herein utilize trade related electronic messages such as mass quote messages, individual order messages, modification messages, cancellation messages, etc., so as to enact trading activity in an electronic market. The trading entity and/or market participant may have one or multiple trading terminals associated with the session. Furthermore, the financial instruments may be financial derivative products. Derivative products may include futures contracts, options on futures contracts, futures contracts that are functions of or related to other futures contracts, swaps, swaptions, or other financial instruments that have their price related to or derived from an underlying product, security, commodity, equity, index, or interest rate product. In one embodiment, the orders are for options contracts that belong to a common option class. Orders may also be for baskets, quadrants, other combinations of financial instruments, etc. The option contracts may have a plurality of strike prices and/or comprise put and call contracts. A mass quote message may be received at an exchange. As used herein, an exchange computing system 100 includes a place or system that receives and/or executes orders.

In an embodiment, a plurality of electronic messages is received from the network. The plurality of electronic messages may be received at a network interface for the electronic trading system. The plurality of electronic messages may be sent from market participants. The plurality of messages may include order characteristics and be associated with actions to be executed with respect to an order that may be extracted from the order characteristics. The action may involve any action as associated with transacting the order in an electronic trading system. The actions may involve placing the orders within a particular market and/or order book of a market in the electronic trading system.

In an embodiment, an incoming transaction may be received. The incoming transaction may be from, and therefore associated with, a market participant of an electronic market managed by an electronic trading system. The transaction may involve an order as extracted from a received message, and may have an associated action. The actions may involve placing an order to buy or sell a financial product in the electronic market, or modifying or deleting such an order. In an embodiment, the financial product may be based on an associated financial instrument which the electronic market is established to trade.

In an embodiment, the action associated with the transaction is determined. For example, it may be determined whether the incoming transaction comprises an order to buy or sell a quantity of the associated financial instrument or an order to modify or cancel an existing order in the electronic market. Orders to buy or sell and orders to modify or cancel may be acted upon differently by the electronic market. For example, data indicative of different characteristics of the types of orders may be stored.

In an embodiment, data relating to the received transaction is stored. The data may be stored in any device, or using any technique, operable to store and provide recovery of data. For example, a memory 204 or computer readable medium 210, may be used to store data, as is described with respect to FIG. 2 in further detail herein. Data may be stored relating received transactions for a period of time, indefinitely, or for a rolling most recent time period such that the stored data is indicative of the market participant's recent activity in the electronic market.

If and/or when a transaction is determined to be an order to modify or cancel a previously placed, or existing, order, data indicative of these actions may be stored. For example, data indicative of a running count of a number or frequency of the receipt of modify or cancel orders from the market participant may be stored. A number may be a total number of modify or cancel orders received from the market participant, or a number of modify or cancel orders received from the market participant over a specified time. A frequency may be a time based frequency, as in a number of cancel or modify orders per unit of time, or a number of cancel or modify orders received from the market participant as a percentage of total transactions received from the participant, which may or may not be limited by a specified length of time.

If and/or when a transaction is determined to be an order to buy or sell a financial product, or financial instrument, other indicative data may be stored. For example, data indicative of quantity and associated price of the order to buy or sell may be stored.

Data indicative of attempts to match incoming orders may also be stored. The data may be stored in any device, or using any technique, operable to store and provide recovery of data. For example, a memory 204 or computer readable medium 210, may be used to store data, as is described with respect to FIG. 2. The acts of the process as described herein may also be repeated. As such, data for multiple received transactions for multiple market participants may be stored and used as describe herein.

The order processing module 118 may also store data indicative of characteristics of the extracted orders. For example, the order processing module may store data indicative of orders having an associated modify or cancel action, such as by recording a count of the number of such orders associated with particular market participants. The order processing module may also store data indicative of quantities and associated prices of orders to buy or sell a product placed in the market order book 110, as associated with particular market participants.

Also, the order processing module 118 may be configured to calculate and associate with particular orders a value indicative of an associated market participant's market activity quality, which is a value indicative of whether the market participant's market activity increases or tends to increase liquidity of a market. This value may be determined based on the price of the particular order, previously stored quantities of orders from the associated market participant, the previously stored data indicative of previously received orders to modify or cancel as associated with the market participant, and previously stored data indicative of a result of the attempt to match previously received orders stored in association with the market participant. The order processing module 118 may determine or otherwise calculate scores indicative of the quality value based on these stored extracted order characteristics, such as an MQI as described herein.

Further, electronic trading systems may perform actions on orders placed from received messages based on various characteristics of the messages and/or market participants associated with the messages. These actions may include matching the orders either during a continuous auction process, or at the conclusion of a collection period during a batch auction process. The matching of orders may be by any technique.

The matching of orders may occur based on a priority indicated by the characteristics of orders and market participants associated with the orders. Orders having a higher priority may be matched before orders of a lower priority. Such priority may be determined using various techniques. For example, orders that were indicated by messages received earlier may receive a higher priority to match than orders that were indicated by messages received later. Also, scoring or grading of the characteristics may provide for priority determination. Data indicative of order matches may be stored by a match engine and/or an order processing module 118, and used for determining MQI scores of market participants.

Example Users

Generally, a market may involve market makers, such as market participants who consistently provide bids and/or offers at specific prices in a manner typically conducive to balancing risk, and market takers who may be willing to execute transactions at prevailing bids or offers may be characterized by more aggressive actions so as to maintain risk and/or exposure as a speculative investment strategy. From an alternate perspective, a market maker may be considered a market participant who places an order to sell at a price at which there is no previously or concurrently provided counter order. Similarly, a market taker may be considered a market participant who places an order to buy at a price at which there is a previously or concurrently provided counter order. A balanced and efficient market may involve both market makers and market takers, coexisting in a mutually beneficial basis. The mutual existence, when functioning properly, may facilitate liquidity in the market such that a market may exist with "tight" bid-ask spreads (e.g., small difference between bid and ask prices) and a "deep" volume from many currently provided orders such that large quantity orders may be executed without driving prices significantly higher or lower.

As such, both market participant types are useful in generating liquidity in a market, but specific characteristics of market activity taken by market participants may provide an indication of a particular market participant's effect on market liquidity. For example, a Market Quality Index ("MQI") of an order may be determined using the characteristics. An MQI may be considered a value indicating a likelihood that a particular order will improve or facilitate liquidity in a market. That is, the value may indicate a likelihood that the order will increase a probability that subsequent requests and transaction from other market participants will be satisfied. As such, an MQI may be determined based on a proximity of the entered price of an order to a midpoint of a current bid-ask price spread, a size of the entered order, a volume or quantity of previously filled orders of the market participant associated with the order, and/or a frequency of modifications to previous orders of the market participant associated with the order. In this way, an electronic trading system may function to assess and/or assign an MQI to received electronic messages to establish messages that have a higher value to the system, and thus the system may use computing resources more efficiently by expending resources to match orders of the higher value messages prior to expending resources of lower value messages.

While an MQI may be applied to any or all market participants, such an index may also be applied only to a subset thereof, such as large market participants, or market participants whose market activity as measured in terms of average daily message traffic over a limited historical time period exceeds a specified number. For example, a market participant generating more than 500, 1,000, or even 10,000 market messages per day may be considered a large market participant.

An exchange provides one or more markets for the purchase and sale of various types of products including financial instruments such as stocks, bonds, futures contracts, options, currency, cash, and other similar instruments. Agricultural products and commodities are also examples of products traded on such exchanges. A futures contract is a product that is a contract for the future delivery of another financial instrument such as a quantity of grains, metals, oils, bonds, currency, or cash. Generally, each exchange establishes a specification for each market provided thereby that defines at least the product traded in the market, minimum quantities that must be traded, and minimum changes in price (e.g., tick size). For some types of products (e.g., futures or options), the specification further defines a quantity of the underlying product represented by one unit (or lot) of the product, and delivery and expiration dates. As will be described, the exchange may further define the matching algorithm, or rules, by which incoming orders will be matched/allocated to resting orders.

Matching and Transaction Processing

Market participants, e.g., traders, use software to send orders or messages to the trading platform. The order identifies the product, the quantity of the product the trader wishes to trade, a price at which the trader wishes to trade the product, and a direction of the order (i.e., whether the order is a bid, i.e., an offer to buy, or an ask, i.e., an offer to sell). It will be appreciated that there may be other order types or messages that traders can send including requests to modify or cancel a previously submitted order.

The exchange computer system monitors incoming orders received thereby and attempts to identify, i.e., match or allocate, as described herein, one or more previously received, but not yet matched, orders, i.e., limit orders to buy or sell a given quantity at a given price, referred to as "resting" orders, stored in an order book database, wherein each identified order is contra to the incoming order and has a favorable price relative to the incoming order. An incoming order may be an "aggressor" order, i.e., a market order to sell a given quantity at whatever may be the current resting bid order price(s) or a market order to buy a given quantity at whatever may be the current resting ask order price(s). An incoming order may be a "market making" order, i.e., a market order to buy or sell at a price for which there are currently no resting orders. In particular, if the incoming order is a bid, i.e., an offer to buy, then the identified order(s) will be an ask, i.e., an offer to sell, at a price that is identical to or higher than the bid price. Similarly, if the incoming order is an ask, i.e., an offer to sell, the identified order(s) will be a bid, i.e., an offer to buy, at a price that is identical to or lower than the offer price.

An exchange computing system may receive conditional orders or messages for a data object, where the order may include two prices or values: a reference value and a stop value. A conditional order may be configured so that when a product represented by the data object trades at the reference price, the stop order is activated at the stop value. For example, if the exchange computing system's order management module includes a stop order with a stop price of 5 and a limit price of 1 for a product, and a trade at 5 (i.e., the stop price of the stop order) occurs, then the exchange computing system attempts to trade at 1 (i.e., the limit price of the stop order). In other words, a stop order is a conditional order to trade (or execute) at the limit price that is triggered (or elected) when a trade at the stop price occurs.

Stop orders also rest on, or are maintained in, an order book to monitor for a trade at the stop price, which triggers an attempted trade at the limit price. In some embodiments, a triggered limit price for a stop order may be treated as an incoming order.

Upon identification (matching) of a contra order(s), a minimum of the quantities associated with the identified order and the incoming order is matched and that quantity of each of the identified and incoming orders become two halves of a matched trade that is sent to a clearing house. The exchange computer system considers each identified order in this manner until either all of the identified orders have been considered or all of the quantity associated with the incoming order has been matched, i.e., the order has been filled. If any quantity of the incoming order remains, an entry may be created in the order book database and information regarding the incoming order is recorded therein, i.e., a resting order is placed on the order book for the remaining quantity to await a subsequent incoming order counter thereto.

It should be appreciated that in electronic trading systems implemented via an exchange computing system, a trade price (or match value) may differ from (i.e., be better for the submitter, e.g., lower than a submitted buy price or higher than a submitted sell price) the limit price that is submitted, e.g., a price included in an incoming message, or a triggered limit price from a stop order.

As used herein, "better" than a reference value means lower than the reference value if the transaction is a purchase (or acquire) transaction, and higher than the reference value if the transaction is a sell transaction. Said another way, for purchase (or acquire) transactions, lower values are better, and for relinquish or sell transactions, higher values are better.

Traders access the markets on a trading platform using trading software that receives and displays at least a portion of the order book for a market, i.e., at least a portion of the currently resting orders, enables a trader to provide parameters for an order for the product traded in the market, and transmits the order to the exchange computer system. The trading software typically includes a graphical user interface to display at least a price and quantity of some of the entries in the order book associated with the market. The number of entries of the order book displayed is generally preconfigured by the trading software, limited by the exchange computer system, or customized by the user. Some graphical user interfaces display order books of multiple markets of one or more trading platforms. The trader may be an individual who trades on his/her behalf, a broker trading on behalf of another person or entity, a group, or an entity. Furthermore, the trader may be a system that automatically generates and submits orders.

If the exchange computer system identifies that an incoming market order may be filled by a combination of multiple resting orders, e.g., the resting order at the best price only partially fills the incoming order, the exchange computer system may allocate the remaining quantity of the incoming, i.e., that which was not filled by the resting order at the best price, among such identified orders in accordance with prioritization and allocation rules/algorithms, referred to as "allocation algorithms" or "matching algorithms," as, for example, may be defined in the specification of the particular financial product or defined by the exchange for multiple financial products. Similarly, if the exchange computer system identifies multiple orders contra to the incoming limit order and that have an identical price which is favorable to the price of the incoming order, i.e., the price is equal to or better, e.g., lower if the incoming order is a buy (or instruction to purchase, or instruction to acquire) or higher if the incoming order is a sell (or instruction to relinquish), than the price of the incoming order, the exchange computer system may allocate the quantity of the incoming order among such identified orders in accordance with the matching algorithms as, for example, may be defined in the specification of the particular financial product or defined by the exchange for multiple financial products.

An exchange responds to inputs, such as trader orders, cancellation, etc., in a manner as expected by the market participants, such as based on market data, e.g., prices, available counter-orders, etc., to provide an expected level of certainty that transactions will occur in a consistent and predictable manner and without unknown or unascertainable risks. Accordingly, the method by which incoming orders are matched with resting orders must be defined so that market participants have an expectation of what the result will be when they place an order or have resting orders and an incoming order is received, even if the expected result is, in fact, at least partially unpredictable due to some component of the process being random or arbitrary or due to market participants having imperfect or less than all information, e.g., unknown position of an order in an order book. Typically, the exchange defines the matching/allocation algorithm that will be used for a particular financial product, with or without input from the market participants. Once defined for a particular product, the matching/allocation algorithm is typically not altered, except in limited circumstance, such as to correct errors or improve operation, so as not to disrupt trader expectations. It will be appreciated that different products offered by a particular exchange may use different matching algorithms.

For example, a first-in/first-out (FIFO) matching algorithm, also referred to as a "Price Time" algorithm, considers each identified order sequentially in accordance with when the identified order was received. The quantity of the incoming order is matched to the quantity of the identified order at the best price received earliest, then quantities of the next earliest best price orders, and so on until the quantity of the incoming order is exhausted. Some product specifications define the use of a pro-rata matching algorithm, wherein a quantity of an incoming order is allocated to each of plurality of identified orders proportionally. Some exchange computer systems provide a priority to certain standing orders in particular markets. An example of such an order is the first order that improves a price (i.e., improves the market) for the product during a trading session. To be given priority, the trading platform may require that the quantity associated with the order is at least a minimum quantity. Further, some exchange computer systems cap the quantity of an incoming order that is allocated to a standing order on the basis of a priority for certain markets. In addition, some exchange computer systems may give a preference to orders submitted by a trader who is designated as a market maker for the product. Other exchange computer systems may use other criteria to determine whether orders submitted by a particular trader are given a preference. Typically, when the exchange computer system allocates a quantity of an incoming order to a plurality of identified orders at the same price, the trading host allocates a quantity of the incoming order to any orders that have been given priority. The exchange computer system thereafter allocates any remaining quantity of the incoming order to orders submitted by traders designated to have a preference, and then allocates any still remaining quantity of the incoming order using the FIFO or pro-rata algorithms. Pro-rata algorithms used in some markets may require that an allocation provided to a particular order in accordance with the pro-rata algorithm must meet at least a minimum allocation quantity. Any orders that do not meet or exceed the minimum allocation quantity are allocated to on a FIFO basis after the pro-rata allocation (if any quantity of the incoming order remains). More information regarding order allocation may be found in U.S. Pat. No. 7,853,499, the entirety of which is incorporated by reference herein and relied upon. Other examples of matching algorithms which may be defined for allocation of orders of a particular financial product include: Price Explicit Time; Order Level Pro Rata; Order Level Priority Pro Rata; Preference Price Explicit Time; Preference Order Level Pro Rata; Preference Order Level Priority Pro Rata; Threshold Pro-Rata; Priority Threshold Pro-Rata; Preference Threshold Pro-Rata; Priority Preference Threshold Pro-Rata; and Split Price-Time Pro-Rata, which are described in U.S. patent application Ser. No. 13/534,499, filed on Jun. 27, 2012, entitled "Multiple Trade Matching Algorithms," published as U.S. Patent Application Publication No. 2014/0006243 A1, the entirety of which is incorporated by reference herein and relied upon.

With respect to incoming orders, some traders, such as automated and/or algorithmic traders, attempt to respond to market events, such as to capitalize upon a mispriced resting order or other market inefficiency, as quickly as possible. This may result in penalizing the trader who makes an errant trade, or whose underlying trading motivations have changed, and who cannot otherwise modify or cancel their order faster than other traders can submit trades there against. It may considered that an electronic trading system that rewards the trader who submits their order first creates an incentive to either invest substantial capital in faster trading systems, participate in the market substantially to capitalize on opportunities (aggressor side/lower risk trading) as opposed to creating new opportunities (market making/higher risk trading), modify existing systems to streamline business logic at the cost of trade quality, or reduce one's activities and exposure in the market. The result may be a lesser quality market and/or reduced transaction volume, and corresponding thereto, reduced fees to the exchange.

With respect to resting orders, allocation/matching suitable resting orders to match against an incoming order can be performed, as described herein, in many different ways. Generally, it will be appreciated that allocation/matching algorithms are only needed when the incoming order quantity is less than the total quantity of the suitable resting orders as, only in this situation, is it necessary to decide which resting order(s) will not be fully satisfied, which trader(s) will not get their orders filled. It can be seen from the above descriptions of the matching/allocation algorithms, that they fall generally into three categories: time priority/first-in-first-out ("FIFO"), pro rata, or a hybrid of FIFO and pro rata.

FIFO generally rewards the first trader to place an order at a particular price and maintains this reward indefinitely. So if a trader is the first to place an order at price X, no matter how long that order rests and no matter how many orders may follow at the same price, as soon as a suitable incoming order is received, that first trader will be matched first. This "first mover" system may commit other traders to positions in the queue after the first move traders. Furthermore, while it may be beneficial to give priority to a trader who is first to place an order at a given price because that trader is, in effect, taking a risk, the longer that the trader's order rests, the less beneficial it may be. For instance, it could deter other traders from adding liquidity to the marketplace at that price because they know the first mover (and potentially others) already occupies the front of the queue.

With a pro rata allocation, incoming orders are effectively split among suitable resting orders. This provides a sense of fairness in that everyone may get some of their order filled. However, a trader who took a risk by being first to place an order (a "market turning" order) at a price may end up having to share an incoming order with a much later submitted order. Furthermore, as a pro rata allocation distributes the incoming order according to a proportion based on the resting order quantities, traders may place orders for large quantities, which they are willing to trade but may not necessarily want to trade, in order to increase the proportion of an incoming order that they will receive. This results in an escalation of quantities on the order book and exposes a trader to a risk that someone may trade against one of these orders and subject the trader to a larger trade than they intended. In the typical case, once an incoming order is allocated against these large resting orders, the traders subsequently cancel the remaining resting quantity which may frustrate other traders. Accordingly, as FIFO and pro rata both have benefits and problems, exchanges may try to use hybrid allocation/matching algorithms which attempt to balance these benefits and problems by combining FIFO and pro rata in some manner. However, hybrid systems define conditions or fixed rules to determine when FIFO should be used and when pro rata should be used. For example, a fixed percentage of an incoming order may be allocated using a FIFO mechanism with the remainder being allocated pro rata.

Order Book Object Data Structures

Figure 3:
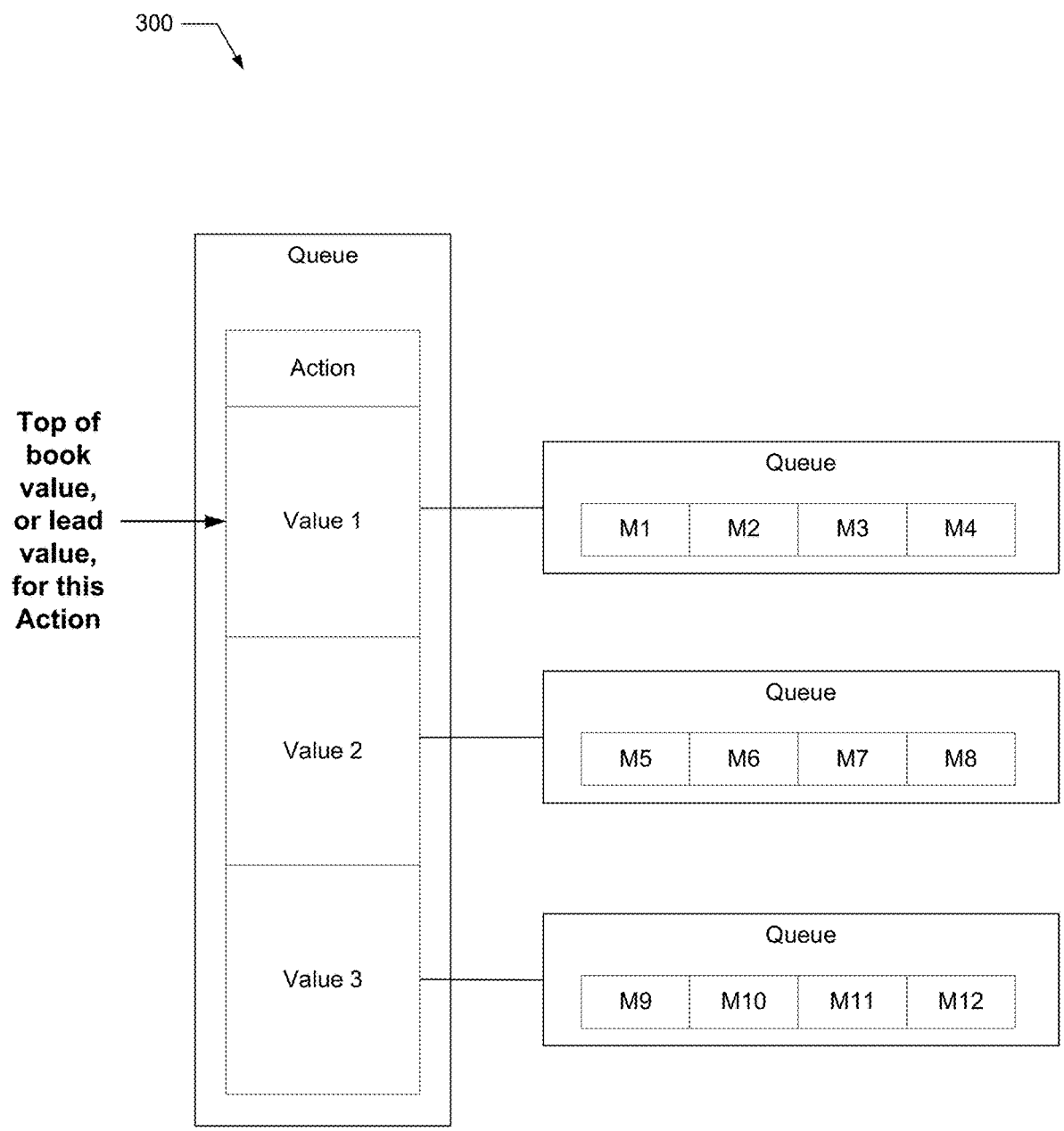
FIG. 3 depicts a storage data structure, according to some embodiments.

In one embodiment, the messages and/or values received for each object may be stored in queues according to value and/or priority techniques implemented by an exchange computing system 100. FIG. 3 illustrates an example data structure 300, which may be stored in a memory or other storage device, such as the memory 204 or storage device 206 described with respect to FIG. 2, for storing and retrieving messages related to different values for the same action for an object. For example, data structure 300 may be a set of queues or linked lists for multiple values for an action, e.g., bid, on an object. Data structure 300 may be implemented as a database. It should be appreciated that the system may store multiple values for the same action for an object, for example, because multiple users submitted messages to buy specified quantities of an object at different values. Thus, in one embodiment, the exchange computing system may keep track of different orders or messages for buying or selling quantities of objects at specified values.

Although the present patent application contemplates using queue data structures for storing messages in a memory, the implementation may involve additional pointers, i.e., memory address pointers, or linking to other data structures. Incoming messages may be stored at an identifiable memory address. The transaction processor can traverse messages in order by pointing to and retrieving different messages from the different memories. Thus, messages that may be depicted sequentially may actually be stored in memory in disparate locations. The software programs implementing the transaction processing may retrieve and process messages in sequence from the various disparate (e.g., random) locations. Thus, in one embodiment, each queue may store different values, which could represent prices, where each value points to or is linked to the messages (which may themselves be stored in queues and sequenced according to priority techniques, such as prioritizing by value) that will match at that value. For example, as shown in FIG. 3, all of the values relevant to executing an action at different values for an object are stored in a queue.

Each value in turn points to, e.g., a linked list or queue logically associated with the values. The linked list stores the messages that instruct the exchange computing system to buy specified quantities of the object at the corresponding value.

Transaction Processor Data Structures

Figure 4A:
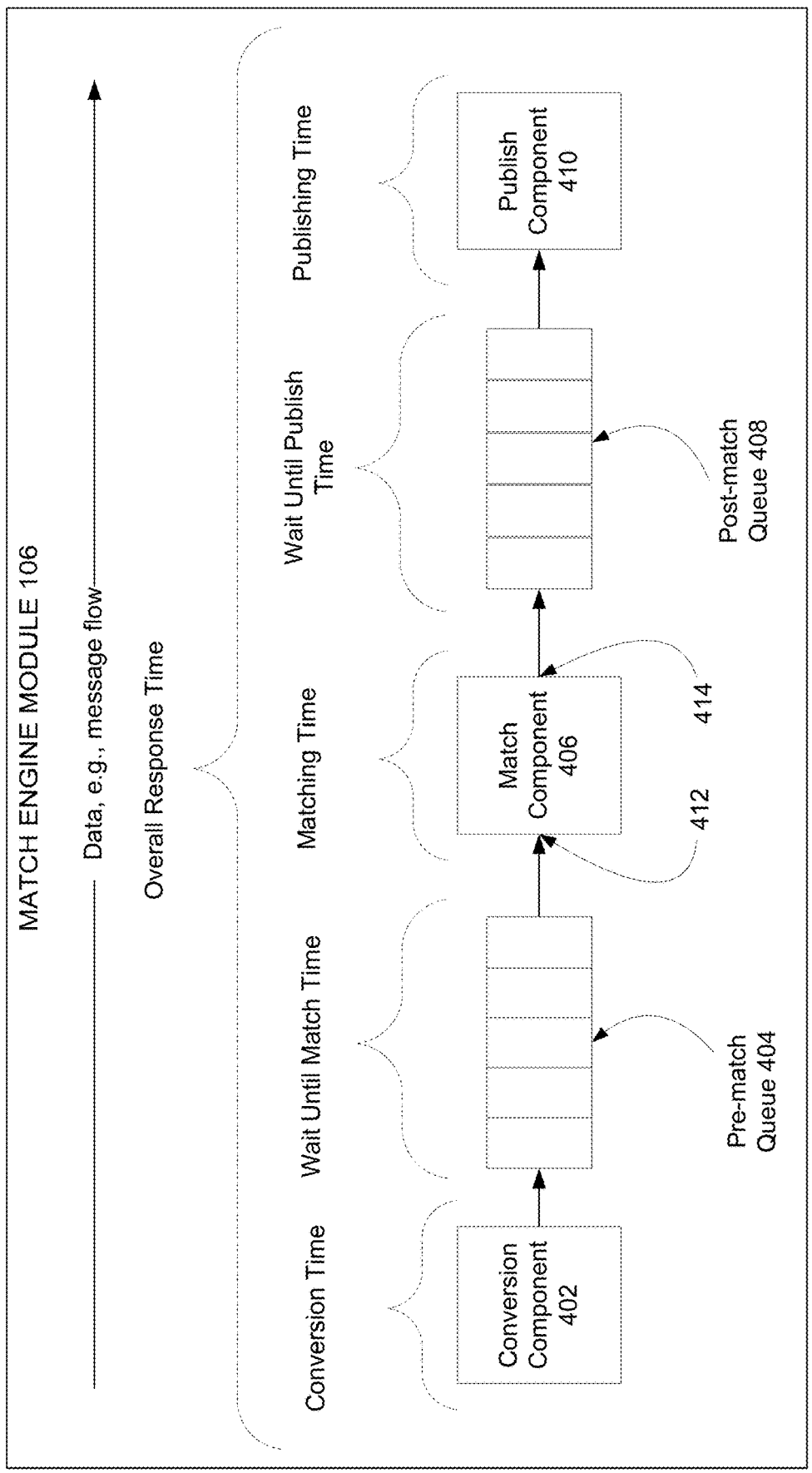
FIG. 4A depicts another storage data structure, according to some embodiments.
Figure 4B:
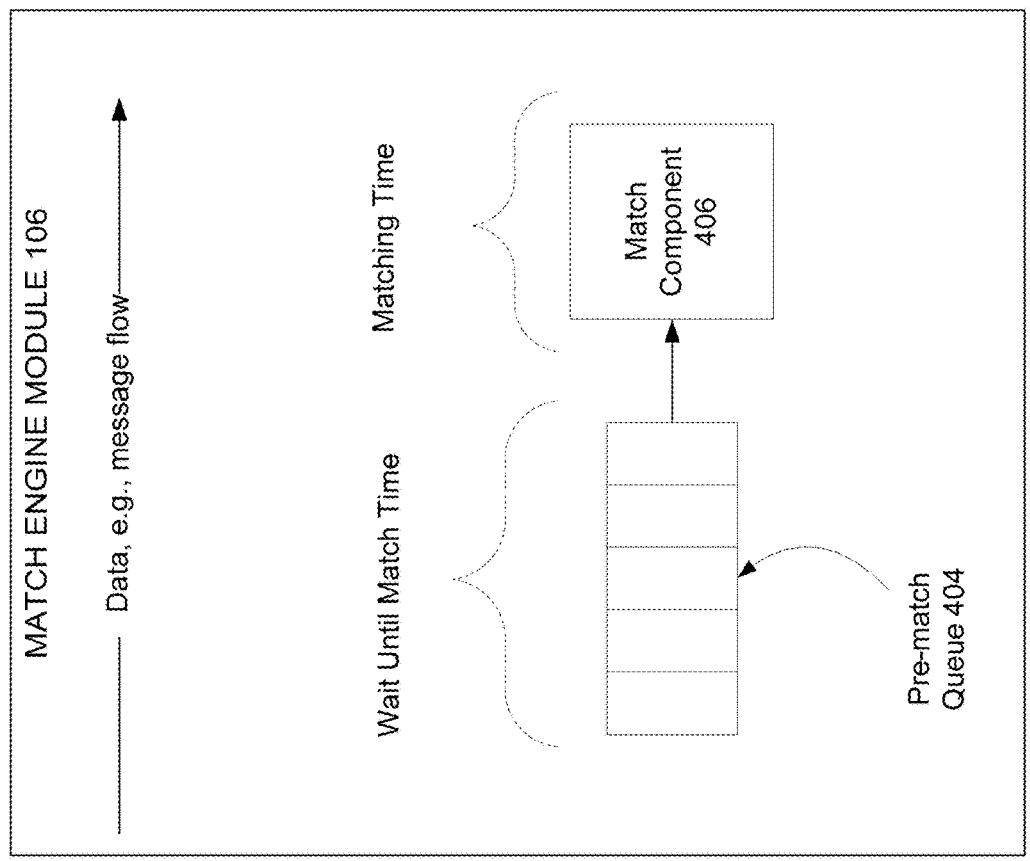
FIG. 4B depicts yet another storage data structure, according to some embodiments.

FIGS. 4A and 4B illustrate an example embodiment of a data structure used to implement match engine module 106. Match engine module 106 may include a conversion component 402, pre-match queue 404, match component 406, post-match queue 408 and publish component 410.

Although the embodiments are disclosed as being implemented in queues, it should be understood that different data structures, such as for example linked lists or trees, may also be used. Although the application contemplates using queue data structures for storing messages in a memory, the implementation may involve additional pointers, i.e., memory address pointers, or linking to other data structures. Thus, in one embodiment, each incoming message may be stored at an identifiable memory address. The transaction processing components can traverse messages in order by pointing to and retrieving different messages from the different memories. Thus, messages that may be processed sequentially in queues may actually be stored in memory in disparate locations. The software programs implementing the transaction processing may retrieve and process messages in sequence from the various disparate (e.g., random) locations.

The queues described herein may, in one embodiment, be structured so that the messages are stored in sequence according to time of receipt, e.g., they may be first-in/first-out (FIFO) queues.

The match engine module 106 may be an example of a transaction processing system. The pre-match queue 404 may be an example of a pre-transaction queue. The match component 406 may be an example of a transaction component. The post-match queue 408 may be an example of a post-transaction queue. The publish component 410 may be an example of a distribution component. The transaction component may process messages and generate transaction component results.

It should be appreciated that match engine module 106 may not include all of the components described herein. For example, match engine module 106 may only include pre-match queue 404 and match component 406, as shown in FIG. 4B. In one embodiment, the latency detection system may detect how long a message waits in a pre-match queue 404 (e.g., latency), and compares the latency to the maximum allowable latency associated with the message.

In one embodiment, the publish component may be a distribution component that can distribute data to one or more market participant computers. In one embodiment, match engine module 106 operates according to a first-in/first-out (FIFO) ordering. The conversion component 402 converts or extracts a message received from a trader via the Market Segment Gateway or MSG into a message format that can be input into the pre-match queue 404.

Messages from the pre-match queue may enter the match component 406 sequentially and may be processed sequentially. In one regard, the pre-transaction queue, e.g., the pre-match queue, may be considered to be a buffer or waiting spot for messages before they can enter and be processed by the transaction component, e.g., the match component. The match component matches orders, and the time a messages spends being processed by the match component can vary, depending on the contents of the message and resting orders on the book. Thus, newly received messages wait in the pre-transaction queue until the match component is ready to process those messages. Moreover, messages are received and processed sequentially or in a first-in, first-out FIFO methodology. The first message that enters the pre-match or pre-transaction queue will be the first message to exit the pre-match queue and enter the match component. In one embodiment, there is no out-of-order message processing for messages received by the transaction processing system. The pre-match and post-match queues are, in one embodiment, fixed in size, and any messages received when the queues are full may need to wait outside the transaction processing system or be re-sent to the transaction processing system.

The match component 406 processes an order or message, at which point the transaction processing system may consider the order or message as having been processed. The match component 406 may generate one message or more than one message, depending on whether an incoming order was successfully matched by the match component. An order message that matches against a resting order in the order book may generate dozens or hundreds of messages. For example, a large incoming order may match against several smaller resting orders at the same price level. For example, if many orders match due to a new order message, the match engine needs to send out multiple messages informing traders which resting orders have matched. Or, an order message may not match any resting order and only generate an acknowledgement message. Thus, the match component 406 in one embodiment will generate at least one message, but may generate more messages, depending upon the activities occurring in the match component. For example, the more orders that are matched due to a given message being processed by the match component, the more time may be needed to process that message. Other messages behind that given message will have to wait in the pre-match queue.

Messages resulting from matches in the match component 406 enter the post-match queue 408. The post-match queue may be similar in functionality and structure to the pre-match queue discussed above, e.g., the post-match queue is a FIFO queue of fixed size. As illustrated in FIGS. 4A and 4B, a difference between the pre- and post-match queues may be the location and contents of the structures, namely, the pre-match queue stores messages that are waiting to be processed, whereas the post-match queue stores match component results due to matching by the match component. The match component receives messages from the pre-match queue, and sends match component results to the post-match queue. In one embodiment, the time that results messages, generated due to the transaction processing of a given message, spend in the post-match queue is not included in the latency calculation for the given message.

Messages from the post-match queue 408 enter the publish component 410 sequentially and are published via the MSG sequentially. Thus, the messages in the post-match queue 408 are an effect or result of the messages that were previously in the pre-match queue 404. In other words, messages that are in the pre-match queue 404 at any given time will have an impact on or affect the contents of the post-match queue 408, depending on the events that occur in the match component 406 once the messages in the pre-match queue 404 enter the match component 406.

As noted above, the match engine module 106 in one embodiment operates in a first-in, first-out (FIFO) scheme. In other words, the first message that enters the match engine module 106 is the first message that is processed by the match engine module 106. Thus, the match engine module 106 in one embodiment processes messages in the order the messages are received. In FIGS. 4A and 4B, as shown by the data flow arrow, data is processed sequentially by the illustrated structures from left to right, beginning at the conversion component 402, to the pre-match queue, to the match component 406, to the post-match queue 408, and to the publish component 410. The overall transaction processing system operates in a FIFO scheme such that data flows from element 402 to 404 to 406 to 408 to 410, in that order. If any one of the queues or components of the transaction processing system experiences a delay, that creates a backlog for the structures preceding the delayed structure. For example, if the match or transaction component is undergoing a high processing volume, and if the pre-match or pre-transaction queue is full of messages waiting to enter the match or transaction component, the conversion component may not be able to add any more messages to the pre-match or pre-transaction queue.

Messages wait in the pre-match queue. The time a message waits in the pre-match queue depends upon how many messages are ahead of that message (i.e., earlier messages), and how much time each of the earlier messages spends being serviced or processed by the match component. Messages also wait in the post-match queue. The time a message waits in the post-match queue depends upon how many messages are ahead of that message (i.e., earlier messages), and how much time each of the earlier messages spends being serviced or processed by the publish component. These wait times may be viewed as a latency that can affect a market participant's trading strategy.

After a message is published (after being processed by the components and/or queues of the match engine module), e.g., via a market data feed, the message becomes public information and is publically viewable and accessible. Traders consuming such published messages may act upon those message, e.g., submit additional new input messages to the exchange computing system responsive to the published messages.

The match component attempts to match aggressing or incoming orders against resting orders. If an aggressing order does not match any resting orders, then the aggressing order may become a resting order, or an order resting on the books. For example, if a message includes a new order that is specified to have a one-year time in force, and the new order does not match any existing resting order, the new order will essentially become a resting order to be matched (or attempted to be matched) with some future aggressing order. The new order will then remain on the books for one year. On the other hand, an order specified as a fill or kill (e.g., if the order cannot be filled or matched with an order currently resting on the books, the order should be canceled) will never become a resting order, because it will either be filled or matched with a currently resting order, or it will be canceled. The amount of time needed to process or service a message once that message has entered the match component may be referred to as a service time. The service time for a message may depend on the state of the order books when the message enters the match component, as well as the contents, e.g., orders, that are in the message.

FIG. 5 depicts a block diagram of a system 500 for computing a forward interest rate for a select future time period subsequent to a current date. It will be appreciated that the system 500 may be a part of, or coupled with, the Forward Rate Module 122, Match Engine Module 514/106, Order Book Module 518/110, Settlement Module 120, or other module of the exchange computing system 100 described above and shown in FIG. 1. The system 500 includes a processor 502, and a non-transitory memory 504 and user interface 506 coupled therewith, such as the processor 202, memory 204 and/or interfaces 214, 216, 218 described in detail above with reference to FIG. 2.

The memory 504 being operative to store instructions, that when executed by the processor 502, cause the processor 502 to: determine a current price for each of a set of interest rate futures contracts having consecutive expiration months which collectively include the selected future time period, and based thereon compute implied interest rates for each of the consecutive expiration months; determine whether any of the consecutive expiration months include a day on which an interest may change based on an event unrelated to transactions involving any of the set of interest rate contracts, and for each of the expiration months determined not to include a day on which an interest may change based on an event unrelated to transactions involving any of the set of interest rate contracts, compute a baseline interest rate for each day of the expiration period determined not to be affected by transactions involving any of the set of interest rate contracts and compute an adjusted baseline interest rate for each day of the expiration period determined to be affected by transactions involving any of the set of interest rate contracts; for each of the expiration months determined to include a day on which an interest may change based on an event unrelated to transactions, starting with the expiration month furthest away from the current date, extrapolate from the baseline and adjusted baseline interest rates for the days of the prior and/or subsequent month forward and/or backward to determine extrapolated interest rate values for each day of the expiration month determined to include a day on which an interest may change based on an event unrelated to transactions from the last day thereof until the day on which an interest may change based on an event unrelated to transactions, and deriving, by the processor, a derived interest rate for each day from the beginning of the expiration month determined to include a day on which an interest may change based on an event unrelated to transactions up to the day on which an interest may change based on an event unrelated to transactions; and determine an initial interest rate value accorded to the current day; and compute, the forward interest rate for the select future time period by combining the initial interest rate value, baseline interest rate value, adjusted baseline interest rate value, extrapolated interest rate value or derived interest rate value for each day of the select future time period.

More particularly, the system 500 may include an interface 506, e.g. a user interface, an instrument identification processor 508 coupled with the interface 506, an interest rate model generator 510 coupled with the instrument identification processor 508 and a term rate generator 512 coupled with the interest rate model generator 510. One or more of the instrument identification processor 508, interest rate model generator 510 and term rate generator 512 may be implemented as a separate component or as one or more logic components, such as on an FPGA which may include a memory or reconfigurable component to store logic and a processing component to execute the stored logic, or as first, second, third, fourth and fifth logic respectively, e.g. computer program logic, stored in a memory, such as the memory 204 shown in FIG. 2 and described in more detail above with respect thereto, or other non-transitory computer readable medium, and executable by a processor, such as the processor 204 shown in FIG. 2 and described in more detail above with respect thereto, to cause the processor 504 to, or otherwise be operative as described.

The system 500 may operate to automatically determine an interest rate associated with a future time period, the data transaction processing system comprising a system in which data items, i.e. orders to buy/sell financial instruments, such as interest rate futures contacts, are transacted by a hardware matching processor, e.g. the electronic trading system described above, that matches groups of electronic data transaction request messages, including an incoming electronic data transaction request message and one or more previously received but unmatched electronic data transaction request messages represented in a data structure, such as an order book database, stored in a memory coupled with the hardware matching processor, for the same one of the data items based on multiple transaction parameters, received from different client computers over a data communications network, the transaction parameters of each of the data items specifying an expiration time period of a set of future expiration time periods, e.g. a number of months, and a proposed transaction price indicative of an interest rate value to be determined at the end of the specified expiration time period based on a set of daily interest rates set prior thereto by a governing authority, each matched group of electronic data transaction request messages being associated with a prevailing transaction price indicative of an expected interest rate value to be determined at the end of the specified expiration time period based on the set of daily interest rates set prior thereto by the governing authority.

In particular, the interface 506 is operative to receive a selection of one or more periods of time subsequent to a current date, e.g. 1, 2, 3, 6 or 12 months, which may be each overlapping or consecutive, for which to determine one or more associated interest rates.

The instrument identification processor 508 is coupled with the interface 506 and operative to determine a consecutive set of expiration time periods which include the selected one or more periods of time and for each expiration time period of the set, and may include the current expiration time period plus the subsequent requisite number of expiration time periods.

The instrument identification processor 508 is further operative to identify a set of matched groups electronic data transaction request messages processed by the hardware matching processor and specifying the expiration time period, computing, by the processor, an aggregate, e.g. using VWAP and/or TWAP, prevailing transaction price for the identified set of matched groups electronic data transaction request messages, and compute, based on the computed aggregate prevailing transaction price, an implied expected interest rate value to be determined at the end of the expiration time period ($R_f$) based on a set daily interest rates set prior thereto by a governing authority for the expiration time period.

The instrument identification processor 508 is further operative to determine a subset of the set of days ($D_T$) within the expiration time period as non-adjustable days ($D_T$-$D_a$) which may be accorded a baseline expected interest rate value ($R_b$) based on transactions transacted by the hardware matching processor, the remainder of the set of days being designated as adjustable days ($D_a$), the adjustable days being known (end of month) or derived turn (seasonal adjustment) days, derived from historical data] on which a deviation from the baseline expected interest rate value ($R_a$) may occur based on transactions transacted by the hardware matching processor, and further determine a magnitude of the deviation (A).

The instrument identification processor 508 is further operative to compute the baseline expected interest rate value ($R_b$) to be accorded to each of the non-adjustable days and compute, based on the magnitude of the deviation, an adjusted baseline expected interest rate value ($R_a$) to be accord to each of the adjustable days.

The instrument identification processor 508 is further operative to determine whether the expiration time period includes a non-transactional change day, e.g. a day on which the governing authority, i.e. monetary policy organization meetings are scheduled to occur, such as an FOMC meeting date, on which a deviation from the baseline expected interest rate value may occur based on an event other than a transaction transacted by the hardware matching processor.

The interest rate model generator 510, coupled with the instrument identification processor 508, is operative to determine an initial interest rate value as the interest rate value set for the day preceding the current day by the governing authority, wherein if the current day is not one of the determined non-adjustable days, adjust the initial interest rate value based on the determined magnitude of the deviation, and accord the initial interest rate value to the current day.

The interest rate model generator 510 being operative to: for each expiration time period determined not to include a non-transactional change day, start from the current date and accord the baseline expected interest rate value for that expiration time period to each day of the determined non-adjustable days of the expiration time period and the adjusted baseline expected interest rate value to each of the adjustable days of the expiration time period; for each expiration time period determined to include a non-transactional change day, start with the expiration time period furthest from the current date, determine the baseline expected interest rate value, the adjusted baseline expected interest rate value, the extrapolated expected interest value or the derived expected interest rate value accorded to the last day of the subsequent time period and determine an extrapolated interest rate value for each day prior thereto until the non-transactional change day, accord the extrapolated expected interest rate value to each day of the expiration time period from the non-transactional change day to the last day thereof, derive a derived expected interest rate value based on the extrapolated expected interest rate value and the implied expected interest rate value to be determined at the end of the expiration time period, and accord the derived expected interest rate value to each day of the expiration time period from the first day thereof until the non-transactional change day, back to the current day; and store in a data structure stored in a memory 504 coupled with the interest rate model generator 510, data indicative of the accorded one of an initial interest rate value, baseline expected interest rate value, an adjusted baseline expected interest rate value, an extrapolated expected interest value or a derived expected interest rate value in association with every day of the set of expiration time periods, this data thereby forming an interest rate model.

The term rate generator 512, coupled with the interest rate model generator 510, is operative to compute, for each of the selected one or more time periods based on the data stored in the data structure, the overall interest rate therefore as a combination of, i.e. aggregate, average or compounded, the initial interest rate value, the baseline expected interest rate value, the adjusted baseline expected interest rate value, the extrapolated expected interest value or the derived expected interest rate value accorded to each day of selected time period.

The system 500 may repeat these operations, such as daily, so as to continuously produce expected interest rates for a forward rolling window of time.

In one embodiment, the transactions transacted by the hardware matching processor 514/106 comprise orders received from the different client computers, via network coupled between the client computers and the data transaction processing system, to buy or sell financial instruments.

In one embodiment, the financial instruments comprise 30 day Fed Funds futures contracts, 30 day Secure Overnight Funding Rate futures contracts, 30 day SONIA futures contracts, or combinations thereof, such as strips of consecutive, e.g. quarterly, 30 day contracts.

In one embodiment, the one or more periods of time comprise one, two, three, six or twelve months, or combinations thereof.

In one embodiment, the consecutive set of expiration time periods comprise the current month and each of the subsequent twelve months.

In one embodiment, the processor 502 is operative to compute the aggregate prevailing transaction price using volume weighed average prices, time weighted average prices or a combination thereof.

In one embodiment, the subset of days within the expiration time period are determined based on historical data indicative of past transactions processed by the hardware matching processor.

In one embodiment, adjustable days comprise days where seasonal deviations from the base line expected interest rate value occur.

In one embodiment, wherein the number days in the expiration time period $D_T$, the number of adjustable days in the expiration time period $D_a$, the number of non-adjustable days in the expiration time period $(D_T-D_a)$, the magnitude of the deviation from the baseline expected interest rate value (A), and wherein the implied expected interest rate value $R_f=[D_a \cdot R_a + (D_T-D_a) \cdot R_b]/D_T$, the baseline expected interest rate value $R_b$ is computed as $R_b=[R_f \cdot D_T - D_a \cdot A]/D_T$ and the adjusted expected interest rate value $R_a$ is computed as $R_a = R_b + A$.

In one embodiment, the non-transactional change day comprises a day on which the governing authority meets to discuss interest rate changes, i.e. the day on which the governing authority specifically announces the outcome of the discussions.

In one embodiment, the stored data indicative of the baseline expected interest rate value, adjusted baseline expected interest rate value, extrapolated expected interest value or derived expected interest rate value for each day of the set of expiration time periods comprises an interest rate model.

In one embodiment, the processor 502 combines the retrieved initial interest rate value, baseline expected interest rate value, adjusted baseline expected interest rate value, extrapolated expected interest value or derived expected interest rate value for each day of the set of expiration time periods by one of averaging or compounding.

Figure 6:
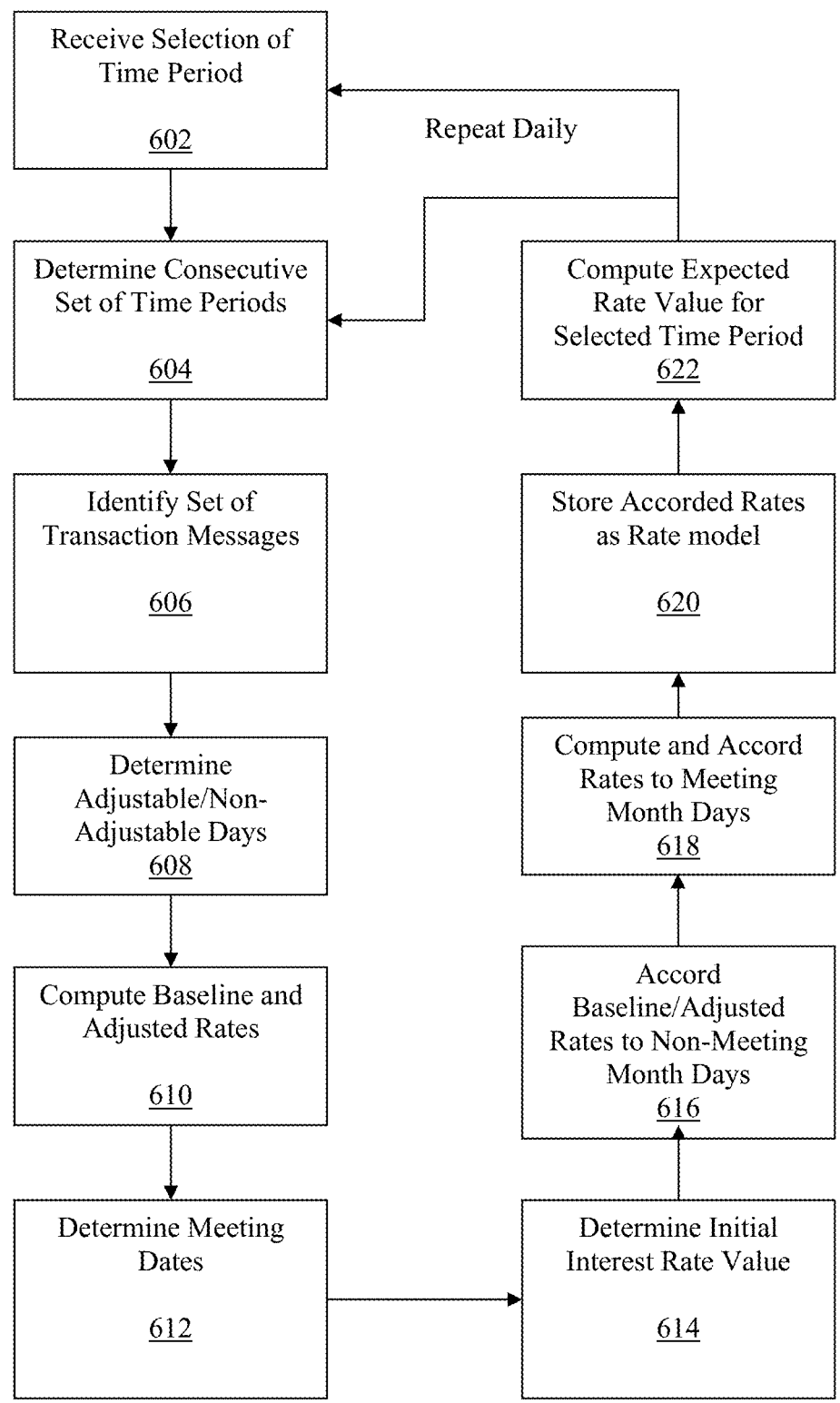
FIG. 6 depicts a flow chart showing the operation of the system of FIG. 5 according to one embodiment.

FIG. 6 depicts a flow chart showing operation of the system 500 of FIGS. 1-5. In particular FIG. 6 shows a method, which may be computer implemented, for automatically determining, by a data transaction processing system, an interest rate associated with a future time period, the data transaction processing system in which data items, e.g. orders to transact (buy/sell) one or more financial instruments such as interest rate futures contracts, are transacted by a hardware matching processor 514/106 that matches groups of electronic data transaction request messages, including an incoming electronic data transaction request message and one or more previously received but unmatched electronic data transaction request messages represented in a data structure 518/110 stored in a memory coupled with the hardware matching processor 514/106, for the same one of the data items based on multiple transaction parameters, received from different client computers over a data communications network, the transaction parameters of each of the data items specifying an expiration time period of a set of future expiration time periods, e.g. a number of consecutive months, and a proposed transaction price indicative of an interest rate value to be determined at the end of the specified expiration time period based on a set of daily interest rates set prior thereto by a governing authority, each matched group of electronic data transaction request messages being associated with a prevailing transaction price indicative of an expected interest rate value to be determined at the end of the specified expiration time period based on the set of daily interest rates set prior thereto by the governing authority.

The operation of the system 500 may include: receiving, by a processor 502, such as via an interface 506, a selection of one or more periods of time subsequent to a current date, e.g. 1, 2, 3, 6, 12 months (overlapping or consecutive), for which to determine one or more associated interest rates (Block 602); determining, by the processor 502, a consecutive set of expiration time periods which include the selected one or more periods of time and for each expiration time period of the set, i.e. the current month plus one or more, e.g. 12, of the consecutive following months (Block 604): identifying, by the processor 502, a set of matched groups electronic data transaction request messages processed by the hardware matching processor 514/106 and specifying the expiration time period, computing, by the processor, an aggregate, e.g. using VWAP and/or TWAP, prevailing transaction price for the identified set of matched groups electronic data transaction request messages, and computing, by the processor 502 based on the computed aggregate prevailing transaction price, an implied expected interest rate value to be determined at the end of the expiration time period ($R_f$) based on a set daily interest rates set prior thereto by a governing authority for the expiration time period (Block 606); determining, by the processor 502, a subset of the set of days ($D_T$) within the expiration time period as non-adjustable days ($D_T-D_a$) which may be accorded a baseline expected interest rate value ($R_b$) based on transactions transacted by the hardware matching processor, the remainder of the set of days being designated as adjustable days ($D_a$), e.g. days being known (end of month) or derived turn (seasonal adjustment) days, derived from historical data, on which a deviation from the baseline expected interest rate value ($R_a$) may occur based on transactions transacted by the hardware matching processor, and further determining, by the processor 502, a magnitude of the deviation (A) (Block 608); computing, by the processor 502, the baseline expected interest rate value ($R_b$) to be accorded to each of the non-adjustable days and computing, based on the magnitude of the deviation, an adjusted baseline expected interest rate value ($R_a$) to be accord to each of the adjustable days (Block 610); determining, by the processor 502, whether the expiration time period includes a non-transactional change day, e.g. a day on which the governing authority, i.e. monetary policy organization meetings are scheduled to occur, such as an FOMC meeting date, on which a deviation from the baseline expected interest rate value may occur based on an event other than a transaction transacted by the hardware matching processor (Block 612); the method further comprising, determining, by the processor 502, an initial interest rate value as the interest rate value set for the day preceding the current day by the governing authority, wherein if the current day is not one of the determined non-adjustable days, adjusting, by the processor, the initial interest rate value based on the determined magnitude of the deviation, and according, by the processor, the initial interest rate value to the current day (Block 614); for each expiration time period determined not to include a non-transactional change day, starting from the current date and according, by the processor 502, the baseline expected interest rate value for that expiration time period to each day of the determined non-adjustable days of the expiration time period and the adjusted baseline expected interest rate value to each of the adjustable days of the expiration time period (Block 616); for each expiration time period determined to include a non-transactional change day, starting with the expiration time period furthest from the current date, determining, by the processor, the baseline expected interest rate value, the adjusted baseline expected interest rate value, the extrapolated expected interest value or the derived expected interest rate value accorded to the last day of the subsequent time period and determining, by the processor 502, an extrapolated interest rate value for each day prior thereto until the non-transactional change day, according, by the processor, the extrapolated expected interest rate value to each day of the expiration time period from the non-transactional change day to the last day thereof, deriving, by the processor 502, a derived expected interest rate value based on the extrapolated expected interest rate value and the implied expected interest rate value to be determined at the end of the expiration time period, and according, by the processor 502, the derived expected interest rate value to each day of the expiration time period from the first day thereof until the non-transactional change day, back to the current day (Block 618); storing, by the processor 502 in a data structure (not shown) stored in a memory 504 coupled therewith, data indicative of the accorded one of an initial interest rate value, baseline expected interest rate value, an adjusted baseline expected interest rate value, an extrapolated expected interest value or a derived expected interest rate value in association with every day of the set of expiration time periods [forming an interest rate model] (Block 620); the method further comprising: computing, by the processor 502 for each of the selected one or more time periods based on the data stored in the data structure, the overall interest rate therefore by retrieving from the memory 504 and combining, i.e aggregating, averaging or compounding, the initial interest rate value, the baseline expected interest rate value, the adjusted baseline expected interest rate value, the extrapolated expected interest value or the derived expected interest rate value accorded to each day of selected time period (Block 622).

In one embodiment of the operation of the system 500, the transactions transacted by the hardware matching processor 514/106 comprise orders received from the different client computers 150-156, via network 160, 162 coupled between the client computers 150-156 and the data transaction processing system 100, to buy or sell financial instruments.

In one embodiment of the operation of the system 500, the financial instruments comprise 30 day Fed Funds futures contracts, 30 day Secure Overnight Funding Rate futures contracts, 30 day SONIA futures contracts, or combinations thereof, such as strips of consecutive, e.g. quarterly, 30 day contracts.

In one embodiment of the operation of the system 500, the one or more periods of time comprise one, two, three, six or twelve months, or combinations thereof.

In one embodiment of the operation of the system 500, the consecutive set of expiration time periods comprise the current month and each of the subsequent twelve months.

In one embodiment of the operation of the system 500, the processor 502 is operative to compute the aggregate prevailing transaction price using volume weighed average prices, time weighted average prices or a combination thereof.

In one embodiment of the operation of the system 500, the subset of days within the expiration time period are determined based on historical data indicative of past transactions processed by the hardware matching processor.

In one embodiment of the operation of the system 500, the adjustable days comprise days where seasonal deviations from the base line expected interest rate value occur.

In one embodiment of the operation of the system 500, wherein the number days in the expiration time period ($D_T$), the number of adjustable days in the expiration time period ($D_a$), the number of non-adjustable days in the expiration time period ($D_T - D_a$), the magnitude of the deviation from the baseline expected interest rate value (A), and wherein the implied expected interest rate value ($R_f = [D_a \cdot R_a + (D_T - D_a) \cdot R_b]/D_T$), the baseline expected interest rate value ($R_b$) is computed as ($R_b = [R_f \cdot D_T - D_a \cdot A]/D_T$) and the adjusted expected interest rate value ($R_a$) is computed as ($R_a = R_b$ A).

In one embodiment of the operation of the system 500, the non-transactional change day comprises a day on which the governing authority meets to discuss interest rate changes.

In one embodiment of the operation of the system 500, the stored data indicative of the baseline expected interest rate value, adjusted baseline expected interest rate value, extrapolated expected interest value or derived expected interest rate value for each day of the set of expiration time periods comprises an interest rate model.

In one embodiment of the operation of the system 500, the processor 502 combines the retrieved initial interest rate value, baseline expected interest rate value, adjusted baseline expected interest rate value, extrapolated expected interest value or derived expected interest rate value for each day of the set of expiration time periods by one of averaging or compounding.

In one embodiment of the operation of the system 500 further includes repeating, by the processor 502, the above method on each calendar day.

As was discussed above, the described embodiments may be used with other types of available futures contracts, such as contracts having shorter or longer terms, and/or more or fewer available nearest expiring contracts. That is, if less than 13 nearest one month contracts are available and/or suitable for use, as described above, available longer term contracts, such as quarterly (3 month) contracts, e.g. 3 month SOFR contracts, may be utilized to provide the requisite scope for computing a complete forward model, as described above, for a given future time period.

For example, as opposed to having 1 month contracts for the nearest 13 months available, the disclosed embodiments may be used in situations where one (1) month contracts may only be available for the nearest seven (7) months and quarterly (3 month term) contracts are available for the nearest six (6) quarters (nearest 6 March Cycle IMM Quarterly dates) as shown in FIG. 8. While, as described above, one month contracts settle based on an average overnight rate for each day of the settlement month, the example quarterly contracts settle based on a compounded interest rate for the days of the settlement quarter. Accordingly, as will be described, the described process for computing the forward interest rate must account for the combination of one month and quarterly contracts as well as the different methods by which the settlement interest rate is computed.

In particular, for the desired forward period, e.g. 1 year, the nearest available one month contracts are identified, e.g. the nearest 7 one month contracts, which encompass the current date plus two good business days plus the subsequent 6 months, i.e. T+2 days+6 months. A "good business day" is the next business day following a weekend or recognized holiday. In one embodiment, where the maturity date is not a good business day, the date is adjusted to the next business day unless that next business day follows in the next month, in which case, the prior business day is used instead.

Subsequent to the 6 month period covered by the available one month contracts, the remainder of the desired forward period is addressed by available quarterly (3 month) contracts for the same time period. As will be described, in this situation, the disclosed embodiments operate similarly as described above, i.e. when utilizing 13 one month contracts, but additionally account for the transition between the average interest rate calculation used in settlement of the one month contracts and the compounded interest rate used in settlement of the quarterly contracts. It will be appreciated that, depending on the current date from which the model is generated, the last one month contract may overlap with the nearest quarterly contract or the cut over from the one month contracts may align with the start date of the nearest quarterly contract.

Where the 6 month period covered by one month contracts ends at the end of the quarter, i.e. there is no overlap between the last one month contract and the nearest quarterly contract, baseline and turn-adjusted rates for all days of the desired forward period may be computed as described above where, for the quarterly contracts, the compounded interest rate is used to extrapolate daily rates from meeting dates as was described above.

Where the end of the 6 month period covered by the 1 month contracts overlaps with the nearest quarterly contract: for all days prior to the 6 month date, daily rates are ascribed based on the one month contracts as described; These daily rates are then used to imply the daily rates for the days remaining, subsequent to the 6 month date, in the quarter covered by the quarterly contract constrained to a constant overnight rate which equates to the implied interest rate for the particular quarterly contract.

Generally then, the disclosed embodiments, whether using all of one type of contract, e.g. all 1 month contracts, or a mix of 1 and 3 month contracts as described, operate in a similar manner accounting for the difference in settlement rate computation and any overlap between the last one month contract and first three month contract. Three month contracts are converted to equivalent over the counter ("otc") swaps with convexity adjustments. Interest rate futures are standardized in that the value of 1 basis point per contract is fixed, for example to $25/bp in CME Eurodollars. In the over the counter (otc) market the value of a basis point varies with the level of interest rates. In the otc world this is known as convexity. In order for the rate implied by an interest rate future to accurately represent the equivalent rate in an otc transaction the futures implied rate must be adjusted for the convexity bias. Further information on convexity is available from Galen Burghardt and William Hoskins in their seminal piece "The Convexity Bias in Eurodollar Futures" published in 1994. For the month overlapping the 6 month date some granularity is inferred from the 1 month contract with rates assigned to dates up to the 6 month date as described. This provides constant rates through the entire forward period, e.g. 12 months from the current date, allowing for calculation of projected OS rates for, for example, 1, 2, 3, 6 and 12 months forward as was described above.

Figure 9:
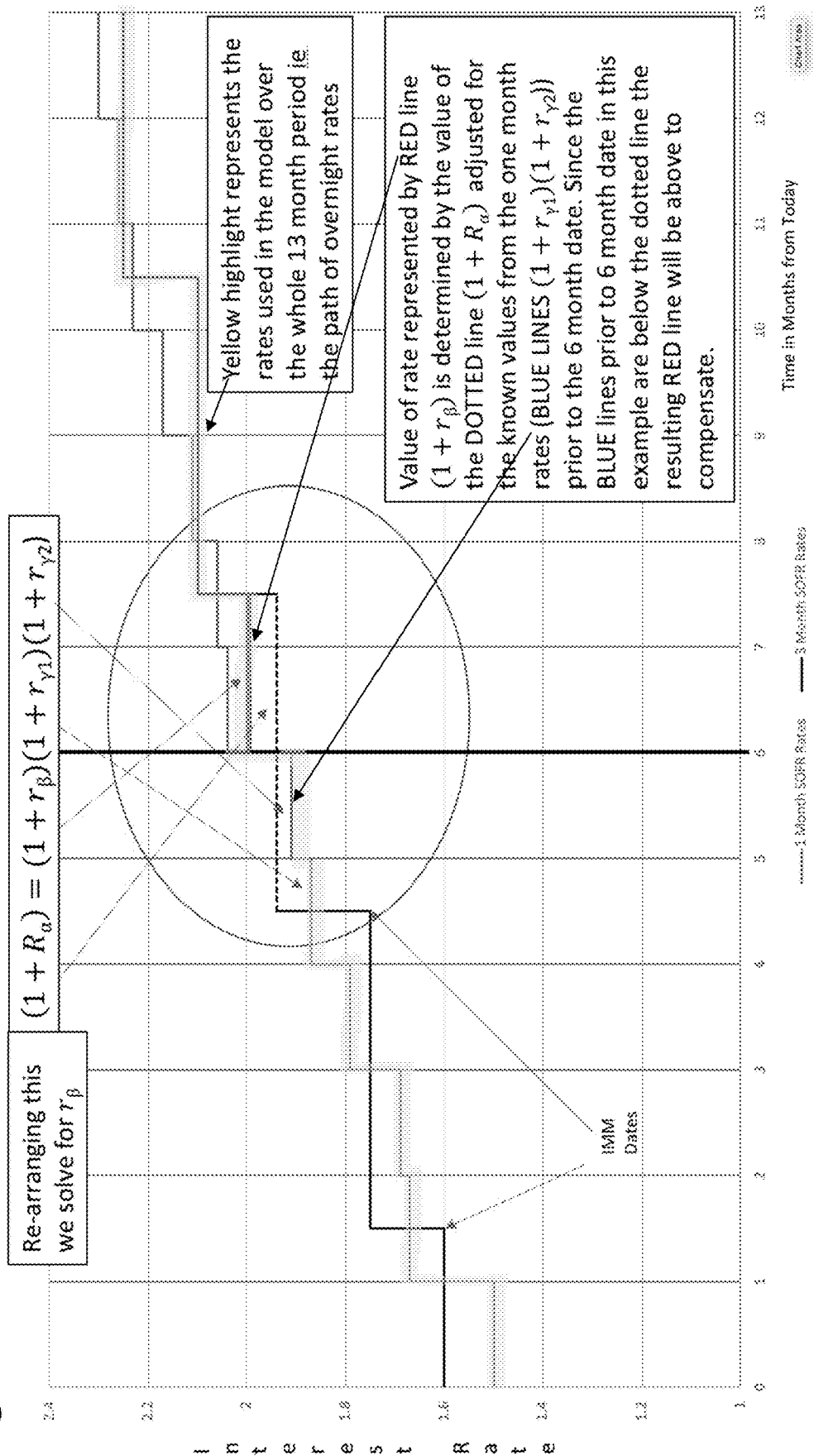
FIG. 9 depicts a graph of example outputs of the system of FIGS. 5 and 6 for an example time period.

FIG. 9 shows a graph depicting overnight rates assigned to each day in a one year period that would aggregate, via either compounding or averaging with or without adjustment for month end turns and using a method that seeks to apply a consistent rate between FOMC communication dates or a consistent rate during each calendar month.

It will be appreciated that the above embodiment may be utilized with fewer, e.g., less than 7, nearest (1) month contracts, utilizing additional quarterly, or other available longer term contracts, as described.

Furthermore, it may be assumed that the provision of inter-commodity spreads between 1 month and 3 month SOFR futures in addition to inter-commodity spreads between Eurodollar futures and 3 month SOFR futures and between Fed Funds Futures and 1 month SOFR futures will, over time, lead to consistent no-arbitrage pricing of both the 1 month futures strip and the 3 month futures strip used in the embodiments described above. Nevertheless, it may be determined that combining liquidity from both the 1 and 3 month strips of futures, and/or allowing each strip to police the integrity of the other, helps to make any term rates derived therefrom, e.g. using the above disclosed embodiments, to be of improved quality/accuracy.

In particular, in one embodiment, the 1 month and 3 month input data may be combined to improve the validity of the output rates. For example, first two methods may be defined for calculating rates from a 1 month strip and one method for a 3 month strip. For the 1 month strip, first a simple method may be provided for assigning rates on a constant overnight basis over the period of each future. Secondly, constant overnight rates may be assigned between FOMC meeting communication dates using the bootstrapping method defined previously.

For the 3 month strip, it may be seen that the options are more limited. Since there is a possibility of more than one FOMC meeting occurring within the period defined by a particular 3 month futures contract, it may be impossible to find a single solution that allows assignment of overnight rates between FOMC meeting dates thus only the option of assigning constant overnight rates for the period of the entire future may be available.

Calculation of Sets of Term Rates: From 1 month strip data—There are two methods described for the calculation from 1-month strip data: First is the simple starting point of having a constant overnight rate within each calendar month—this is simple because each calendar month is an input; and second is the more complex method of seeking to assign a constant overnight rate between FOMC communication dates as described in the initial embodiments over a 12 month period.

A convexity adjustment may be necessary, wherein initially at low rates the adjustment may be zero, the source adjustments may be derived from a volatility surface on the underlying rate, it will take some time for that to develop, alternatively a scaling or other modification of rates used for Eurodollars may be used, Bloomberg may be one source for these inputs. Where the adjustment may initially not exist, zero may be used or alternatively a modification of the adjustments used in other similar markets such as Eurodollars may be used;

Adjustments for end of month turns or other known structural/predictable variations may be made based on predetermined and published methods, such as a defined look back period to determine the average adjustment realized over said look back period, these may be reviewed, amended and agreed by a benchmark administration governance committee;

Constant overnight rate for each day within a futures month assigns an overnight rate to each day;

Compounding of assigned overnight rates is used to derive set of term rates;

Will only provide the set of term rates with maturities up to 6 months initially due to there only being only 7 contracts listed;

Convexity adjustment may be necessary (as above except that the constraint is constant overnight rate between FOMC meeting dates);

It should be possible to make adjustment for end of month turns or other known structural/predictable variations (as noted above);

A constant overnight rate is assigned for each day between known FOMC communication dates;

Months that do not contain FOMC meetings have overnight rates assigned first derived from convexity adjusted futures price, then rates are extrapolated forwards and backwards as necessary to FOMC communication dates, then remainder of month is calculated from the futures price and the assigned rate from the previous or next known period;

Compounding of assigned overnight rates to derive set of term rates; and

Will only provide the set of term rates with maturities up to 6 months initially due to there only being only 7 contracts listed.

Calculation of Sets of Term Rates: From 3 month strip data

Convexity adjustment may be necessary (as above);

It should be possible to make adjustment for end of month turns or other known structural/predictable variations;

Constant overnight rate for each day within a futures quarterly period assigns an overnight rate to each day;

Compounding of assigned overnight rates to derive set of term rates; and

Availability of contact data covering longer than 12 months (ie up to 5 years) assures the possibility of producing a set of term rate covering all maturities of LIBOR up to and including 12 months Now we consider 3 methods for combining the outputs of these approaches Method 1

Calculate sets of term rates independently from 1 month strip data and 3 month strip data.

Use either of the above described 1 month methods and the 3 month method.

Take a simple average of the output sets of term rates

Alternatively produce a trade weighted average (based on the ratio of volumes in each strip).

Method 2

Calculate using the 1 month strip using the constant overnight rate between FOMC communication dates method only for greatest granularity.

Use the assigned rates to calculate the implied price of the 3 month strips futures to check validity.

If the implied prices are tolerably close, i.e., within the minimum bid offer of the futures contract the set of term rates from the 1 month strip may be accepted. If the rates are outside of tolerance adjustment may be made.

Adjustment of the term rates by half the difference between actual rate implied by 3 month futures strip and the rates of the 3 month strip implied by the 1 month strip.

Adjustment by a weighting of this difference determined by the average volumes traded in the two strips Method 3

Note that near the start of a month (or the end of the previous month) rates implied by the 1 month strip using a constant overnight rate for the whole month will be near accurate because of the close alignment of the contract dates with the maturities of the set of term rates. On the first day of each month the term rate implied by the prices of the first 6 monthly futures should provide a perfectly accurate set of term rates for the required maturities up to 6 months (1 month, 2 months, 3 months and 6 months).

Similarly, it is noted that close to 3 month quarterly IMM dates the rate implied by the 3 month futures strip should be very accurate for the prediction of the term rates of the 3 month, 6 month and 12 month maturities.

Method 3 calculates the term rates for the 1 month and 3 months strips using the constant overnight method for the futures period. The inputs are then weighted based on the proximity of the current date to either the IMM date or to month start/end.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is therefore intended that the foregoing detailed description be regarded as illustrative rather than limiting, and that it be understood that it is the following claims, including all equivalents, that are intended to define the spirit and scope of this invention.

What is claimed is:

1. A computer implemented method comprising:
automatically determining, by a data transaction processing system in which data items are transacted by a hardware matching processor, an overall interest rate associated with a selection of one or more periods of time subsequent to a current date, the hardware matching processor matching groups of electronic data transaction request messages to buy or sell the data items, the electronic data transaction request messages received from different client computers over a data communications network, each of the groups of the electronic data transaction request messages including an incoming electronic data transaction request message and one or more previously received but unmatched electronic data transaction request messages represented in a data structure stored in a memory coupled with the hardware matching processor, each of the electronic data transaction request messages having multiple transaction parameters, the multiple transaction parameters specifying a one time period of a set of available future expiration time periods and a proposed transaction price indicative of an expected settlement interest rate value, the actual settlement interest rate value determined at the end of the specified one time period based on a daily interest rate set the day preceding the end of the specified one time period by a governing authority, the hardware matching processor matching each of the groups of the electronic data transaction request messages for one of the data items based on the multiple transaction parameters, each matched group of electronic data transaction request messages being associated with a prevailing transaction price indicative of the expected settlement interest rate value, the automatically determining of the overall interest rate further comprising:
receiving, by a hardware forward rate processor separate from the hardware matching processor, the selection of the one or more periods of time subsequent to the current date, wherein the determination of one or more associated interest rates is based on the selection of the one or more periods of time subsequent to the current date;
determining, by the hardware forward rate processor, a consecutive set of expiration time periods which include at least the selected one or more periods of time and for each expiration time period of the consecutive set of expiration time periods:
identifying, by the hardware forward rate processor, a set of matched groups of the electronic data transaction request messages processed by the hardware matching processor based on the specified one time period of each of the electronic data transaction request messages of the set of the matched groups, wherein the specified one time period of each of the electronic transaction request messages includes the expiration time period, computing, by the hardware forward rate processor, an aggregate prevailing transaction price for the identified set of matched groups electronic data transaction request messages, and computing, by the hardware forward rate processor based on the computed aggregate prevailing transaction price, an aggregate implied expected interest rate value determined for the end of the specified one time period;
determining, by the hardware forward rate processor, a subset of the set of days within the expiration time period as non-adjustable days, each of the non-adjustable days being accorded a baseline expected interest rate value computed based on transactions transacted by the hardware matching processor, the remainder of the set of days being designated as adjustable days on which a deviation from the baseline expected interest rate value occurs based on transactions transacted by the hardware matching processor, and further determining, by the hardware forward rate processor, a magnitude of the deviation based on a historical data of transactions transacted by the hardware matching processor during the adjustable days;
computing, by the hardware forward rate processor, based on the magnitude of the deviation, an adjusted baseline expected interest rate value being accorded to each of the adjustable days; and
determining, by the hardware forward rate processor, whether the expiration time period includes a non-transactional change day on which a non-transactional deviation from the baseline expected interest rate value occurs based on an event other than a transaction transacted by the hardware matching processor;

the method further comprising:
- determining, by the hardware forward rate processor, an initial interest rate value as the interest rate value set for the day preceding the current day by the governing authority, wherein if the current day is not one of the determined non-adjustable days and if the current day is one of the determined adjustable days, adjusting, by the hardware forward rate processor, the initial interest rate value based on the determined magnitude of the deviation, and
- according, by the hardware forward rate processor, the initial interest rate value to the current day;
- for each expiration time period determined not to include a non-transactional change day, starting from the current date, according, by the hardware forward rate processor, the baseline expected interest rate value for that expiration time period to each day of the determined non-adjustable days of the expiration time period and the adjusted baseline expected interest rate value to each of the adjustable days of the expiration time period;
- for each expiration time period determined to include a non-transactional change day, starting with the expiration time period furthest from the current date, determining, by the hardware forward rate processor, an extrapolated interest rate value for each day prior thereto until the non-transactional change day, the extrapolated interest value determined based on the baseline expected interest rate value or the adjusted baseline expected interest rate value accorded to the last day of the subsequent time period, and according, by the hardware forward rate processor, the extrapolated expected interest rate value to each day of the expiration time period from the non-transactional change day to the last day thereof, and further deriving, by the hardware forward rate processor, a derived expected interest rate value based on the extrapolated expected interest rate value and the aggregate implied expected interest rate value determined for the end of the expiration time period, and according, by the hardware forward rate processor, the derived expected interest rate value to each day of the expiration time period from a first day thereof until the non-transactional change day, back to the current day; and
- storing, by the hardware forward rate processor in a data structure stored in a memory coupled therewith, for every day of the set of the expiration time periods including the current day, the adjustable and the non-adjustable days, data indicative of the accorded one of the initial interest rate value, the baseline expected interest rate value, the adjusted baseline expected interest rate value, the extrapolated expected interest value or the derived expected interest rate value in association with every day of the set of expiration time periods; and the method further comprising:
- computing, by the hardware forward rate processor for each of the selected one or more time periods based on the data stored in the data structure, the overall interest rate by retrieving from the memory and combining the data indicative of the accorded one of the initial interest rate value, the baseline expected interest rate value, the adjusted baseline expected interest rate value, the extrapolated expected interest value or the derived expected interest rate value for each day of the selected one or more time periods.

2. The computer implemented method of claim 1 wherein the transactions transacted by the hardware matching processor comprise orders received from the different client computers, via the data communications network coupled between the client computers and the data transaction processing system, to buy or sell financial instruments.

3. The computer implemented method of claim 2 wherein the financial instruments comprise 30 day Fed Funds futures contracts, 30 day Secure Overnight Funding Rate futures contracts, 30 day SONIA futures contracts, or combinations thereof.

4. The computer implemented method of claim 1 wherein the one or more periods of time comprise one, two, three, six or twelve months, or combinations thereof.

5. The computer implemented method of claim 1 wherein the consecutive set of the expiration time periods comprise a current month and each of the subsequent twelve months.

6. The computer implemented method of claim 1 wherein the hardware forward rate processor is operative to compute the aggregate prevailing transaction price using volume weighed average prices, time weighted average prices or a combination thereof.

7. The computer implemented method of claim 1 wherein the subset of the set of days within the expiration time period are determined based on historical data indicative of past transactions processed by the hardware matching processor.

8. The computer implemented method of claim 1 wherein adjustable days comprise days where seasonal deviations from the baseline expected interest rate value occur.

9. The computer implemented method of claim 1, wherein the aggregate implied expected interest rate value ($R_f$) is determined as $R_f=[D_a \cdot R_a+(D_T-D_a) \cdot R_b]/D_T$, where $D_T$ is the number of days in the expiration time period, $D_a$ is the number of adjustable days in the expiration time period, the number of non-adjustable days in the expiration time period is computed as $(D_T-D_a)$, $R_b$ is the baseline expected interest rate value, $R_a$ is the adjusted expected interest rate value and (A) is the magnitude of the deviation from the baseline expected interest rate value, where solving for $R_a$ and $R_b$:

$R_b$ is computed as $R_b=[R_f \cdot D_T-D_a \cdot A]/D_T$ and $R_a$ is computed as $R_a=R_b+A$.

10. The computer implemented method of claim 1 wherein the non-transactional change day comprises a day on which the governing authority meets and discusses interest rate changes.

11. The computer implemented method of claim 1 wherein the stored data indicative of the accorded one of the baseline expected interest rate value, the adjusted baseline expected interest rate value, the extrapolated expected interest value or the derived expected interest rate value for each day of the set of the expiration time periods comprises an interest rate model.

12. The computer implemented method of claim 1 wherein the hardware forward rate processor combines the retrieved initial interest rate value, baseline expected interest rate value, adjusted baseline expected interest rate value, extrapolated expected interest value, or derived expected interest rate value for each day of the set of expiration time periods by one of averaging or compounding.

13. The computer implemented method of claim 1 further comprising repeating, by the hardware forward rate processor, the method on each day.

14. A system comprising:
a data transaction processing system, in which data items are transacted by a hardware matching processor, that automatically determines an overall interest rate associated with a selection of one or more periods of time subsequent to a current date, the hardware matching processor matching groups of electronic data transaction request messages to buy or sell the data items, the electronic data transaction request messages received from different client computers over a data communications network, each of the groups of the electronic data transaction request messages including an incoming electronic data transaction request message and one or more previously received but unmatched electronic data transaction request messages represented in a data structure stored in a memory coupled with the hardware matching processor, each of the electronic data transaction request messages having multiple transaction parameters, the multiple transaction parameters specifying a one time period of a set of available future expiration time periods and a proposed transaction price indicative of an expected settlement interest rate value, the actual settlement interest rate value determined at the end of the specified one time period based on a daily interest rate set the day preceding the end of the specified one time period by a governing authority, the hardware matching processor matching each of the groups of the electronic data transaction request messages for one of the data items based on the multiple transaction parameters, each matched group of electronic data transaction request messages being associated with a prevailing transaction price indicative of the expected settlement interest rate value, the data transaction system further comprising:
a second non-transitory memory;
a hardware forward rate processor separate from the hardware matching processor and coupled with the second non-transitory memory, the hardware forward rate processor executing instructions stored in the second non-transitory memory to implement:
  a user interface operative to receive the selection of the one or more periods of time subsequent to the current date, wherein the determination of one or more associated interest rates is based on the selection of the one or more periods of time subsequent to the current date;
  an instrument identification processor coupled with the user interface and operative to determine a consecutive set of expiration time periods which include at least the selected one or more periods of time and for each expiration time period of the consecutive set of expiration time periods:
    identify a set of matched groups of the electronic data transaction request messages processed by the hardware matching processor based on the specified one time period of each of the electronic data transaction request messages of the set of the matched groups, wherein the specified one time period of each of the electronic transaction request messages includes the expiration time period, computing an aggregate prevailing transaction price for the identified set of matched groups electronic data transaction request messages, and compute, based on the computed aggregate prevailing transaction price, an aggregate implied expected interest rate value determined for the end of the specified one time period;
    determine a subset of the set of days within the expiration time period as non-adjustable days, each of the non-adjustable day being accorded a baseline expected interest rate value computed based on transactions transacted by the hardware matching processor, the remainder of the set of days being designated as adjustable days on which a deviation from the baseline expected interest rate value occurs based on transactions transacted by the hardware matching processor, and further determine a magnitude of the deviation based on a historical data of transactions transacted by the hardware matching processor during the adjustable days;
    compute, based on the magnitude of the deviation, an adjusted baseline expected interest rate value being accorded to each of the adjustable days;
    determine whether the expiration time period includes a non-transactional change day on which a deviation from the baseline expected interest rate value occurs based on an event other than a transaction transacted by the hardware matching processor;
the system further comprising an interest rate model generator implemented by the hardware forward rate processor and coupled with the instrument identification processor and operative to:
  determine an initial interest rate value as the interest rate value set for the day preceding the current day by the governing authority, wherein if the current day is not one of the determined non-adjustable days, and if the current day is one of the determined adjustable days, adjust the initial interest rate value based on the determined magnitude of the deviation, and
  accord the initial interest rate value to the current day;
wherein the interest rate model generator is further operative to:
  for each expiration time period determined not to include a non-transactional change day, start from the current date and accord the baseline expected interest rate value for that expiration time period to each day of the determined non-adjustable days of the expiration time period and the adjusted baseline expected interest rate value to each of the adjustable days of the expiration time period;
  for each expiration time period determined to include a non-transactional change day, start with the expiration time period furthest from the current date, determine an extrapolated interest rate value for each day prior thereto until the non-transactional change day, the extrapolated interest value determined based on the baseline expected interest rate value or the adjusted baseline expected interest rate value accorded to the last day of the subsequent time period, and accord the extrapolated expected interest rate value to each day of the expiration time period from the non-transactional change day to the last day thereof, and further derive a derived expected interest rate value based on the extrapolated expected interest rate value and the implied expected interest rate value determined at the end of the expiration time period, and accord the derived expected interest rate value to each day of the expiration time period from a first day thereof until the non-transactional change day, back to the current day; and store in a data structure stored in a memory coupled with the interest rate model generator, for every day of the set of the expiration time periods including the current day, the adjustable and the non-adjustable days, data indicative of the accorded one of the initial interest rate value, the baseline expected interest rate value, the adjusted baseline expected interest rate value, the extrapolated expected interest value or the derived expected interest rate value in association with every day of the set of expiration time periods; and the system further comprising a term rate generator implemented by the forward rate processor coupled with the interest rate model generator and operative to compute, for each of the selected one or more time periods based on the data stored in the data structure, the overall interest rate therefore as a combination of the data indicative of the accorded one of the initial interest rate value, the baseline expected interest rate value, the adjusted baseline expected interest rate value, the extrapolated expected interest value or the derived expected interest rate value for each day of selected one or more time periods.

15. The system of claim 14 wherein the transactions transacted by the hardware matching processor comprise orders received from the different client computers, via the data communications network coupled between the client computers and the data transaction processing system, to buy or sell financial instruments.

16. The system of claim 15 wherein the financial instruments comprise 30 day Fed Funds futures contracts, 30 day Secure Overnight Funding Rate futures contracts, 30 day SONIA futures contracts, or combinations thereof.

17. The system of claim 14 wherein the one or more periods of time comprise one, two, three, six or twelve months, or combinations thereof.

18. The system of claim 14 wherein the consecutive set of expiration time periods comprise the current month and each of the subsequent twelve months.

19. The system of claim 14 wherein the instrument identification processor is operative to compute the aggregate prevailing transaction price using volume weighed average prices, time weighted average prices or a combination thereof.

20. The system of claim 14 wherein the subset of the set of days within the expiration time period are determined based on historical data indicative of past transactions processed by the hardware matching processor.

21. The system of claim 14 wherein adjustable days comprise days where seasonal deviations from the baseline expected interest rate value occur.

22. The system of claim 14, wherein the aggregate implied expected interest rate value ($R_f$) is determined as $R_f = [D_a \cdot R_a + (D_T - D_a) \cdot R_b]/D_T$, where $D_T$ is the number of days in the expiration time period, $D_a$ is the number of adjustable days in the expiration time period, the number of non-adjustable days in the expiration time period is computed as $(D_T - D_a)$, $R_b$ is the baseline expected interest rate value, $R_a$ is the adjusted expected interest rate value and $(A)$ is the magnitude of the deviation from the baseline expected interest rate value, where solving for $R_a$ and $R_b$:

$R_b$ is computed as $R_b = [R_f \cdot D_T - D_a \cdot A]/D_T$ and $R_a$ is computed as $R_a = R_b + A$.

23. The system of claim 14 wherein the non-transactional change day comprises a day on which the governing authority meets and discusses interest rate changes.

24. The system of claim 14 wherein the stored data indicative of the accorded one of the baseline expected interest rate value, the adjusted baseline expected interest rate value, the extrapolated expected interest value or the derived expected interest rate value for each day of the set of expiration time periods comprises an interest rate model.

25. The system of claim 14 wherein the term rate generator combines the retrieved initial interest rate value, the baseline expected interest rate value, the adjusted baseline expected interest rate value, the extrapolated expected interest value or the derived expected interest rate value for each day of the set of the selected expiration time periods by one of averaging or compounding.

26. The system of claim 14 further comprising repeating, by the forward rate processor, the operations of the instrument identification processor, interest rate model generator and term rate generator on each day.

* * * * *